United States Patent
Yoshino et al.

(10) Patent No.: US 7,021,286 B2
(45) Date of Patent: Apr. 4, 2006

(54) IGNITION TIMING CONTROL FOR INTERNAL COMBUSTION ENGINE

(75) Inventors: Takahiro Yoshino, Yokosuka (JP); Yuji Sasaki, Yokohama (JP); Hatsuo Nagaishi, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/057,224

(22) Filed: Feb. 15, 2005

(65) Prior Publication Data

US 2005/0188954 A1      Sep. 1, 2005

(30) Foreign Application Priority Data

| Feb. 20, 2004 | (JP) | .............................. 2004-044423 |
| Feb. 20, 2004 | (JP) | .............................. 2004-044495 |

(51) Int. Cl.
*F02P 5/152* (2006.01)
(52) U.S. Cl. ........................... 123/406.29; 123/406.37; 701/111
(58) Field of Classification Search ........... 123/406.21, 123/406.22, 406.29, 406.37, 406.41, 406.55; 701/111
See application file for complete search history.

(56) References Cited

U.S. PATENT DOCUMENTS

| 5,243,942 | A | * | 9/1993 | Entenmann et al. ... 123/406.33 |
| 5,345,921 | A | | 9/1994 | Iwano et al. |
| 5,771,862 | A | * | 6/1998 | Unland et al. ......... 123/406.33 |
| 5,865,153 | A | | 2/1999 | Matsumoto |
| 6,234,146 | B1 | * | 5/2001 | Tanaya et al. ......... 123/406.37 |
| 6,474,302 | B1 | * | 11/2002 | Takahashi et al. ..... 123/406.21 |
| 6,557,526 | B1 | | 5/2003 | Hoshino |
| 6,557,527 | B1 | * | 5/2003 | Miyaji .................... 123/406.36 |
| 6,581,570 | B1 | * | 6/2003 | Franke et al. .......... 123/406.21 |
| 2004/0103860 | A1 | | 6/2004 | Zur Loye et al. |

FOREIGN PATENT DOCUMENTS

| JP | 7-332149 A | 12/1995 |
| WO | WO 01/51808 A1 | 7/2001 |

OTHER PUBLICATIONS

U.S. Appl. No. 11/057,237, filed Feb. 15, 2005, Yoshino et al.
U.S. Appl. No. 11/057,221, filed Feb. 15, 2005, Yoshino et al.

* cited by examiner

Primary Examiner—Hai Huynh
(74) Attorney, Agent, or Firm—Foley & Lardner LLP

(57) ABSTRACT

An internal combustion engine (1) causes an air/fuel mixture in a cylinder to combust due to ignition by a spark plug (14). An engine controller (50) calculates an ignition delay of the gas in the cylinder on the basis of an operational state of the engine (1)(53), and it calculates a knock generation index which is an indicator of the occurrence of knock on the basis of the ignition delay (53). The controller (50) calculates a limit ignition timing at which knock is not generated, on the basis of the knock generation index (54), and by controlling the ignition timing of the spark plug (14) to the limit ignition timing (55), appropriate control of the ignition timing is achieved by means of a small number of adaptation steps.

19 Claims, 26 Drawing Sheets

IGNITION TIMING CONTROL FOR INTERNAL COMBUSTION ENGINE

FIELD OF THE INVENTION

This invention relates to control of ignition timing in order to prevent knocking in an internal combustion engine.

BACKGROUND OF THE INVENTION

In a spark-ignition internal combustion engine, the ignition timing affects fuel consumption and engine output, and inappropriate ignition timing leads to knocking, ignition failures, and the like.

Normally, the ignition timing is set in such a manner that the internal cylinder pressure reaches a maximum pressure at 10–15 degrees After Top Dead Center (deg. ATDC). However, the Minimum Spark Advance for Best Torque, (hereinafter, abbreviated to "MBT") which is used as a basis for setting the ignition timing, varies according to the engine rotation speed, the engine load, the air/fuel ratio of the mixture supplied to the engine, the Exhaust Gas Recirculation (EGR) ratio, and other factors.

Therefore, in conventional ignition timing control, the ignition timing is determined in accordance with the operating conditions, by using a basic ignition timing map which corresponds to the engine rotation speed and engine load, together with a map of correctional values devised for various operational states. In this method, in order to improve the accuracy of the control, it is necessary to increase the grid density of each map as well as the number of maps. As a result, an enormous amount of preliminary experimentation is required in order to create the maps.

On the other hand, a method is also known in which knocking is detected by a knock sensor, and if knocking is detected, then the ignition timing is retarded by means of feedback control. However, since the ignition timing is subjected to feedback control after knocking has actually occurred, then there is a delay in the control procedure.

SUMMARY OF THE INVENTION

Tokkai Hei 7-332149 issued by the Japan Patent Office in 1995 discloses a method in which the temperature of the gas inside a cylinder is calculated, assuming adiabatic compression of the gas in the cylinder, from the pressure inside the cylinder with respect to the crank angle, and the temperature of the gas in the cylinder at the crank angle corresponding to the start of calculation. If the temperature of the gas inside the cylinder reaches 1200 K or above, then it is considered that knocking will occur. Here, K indicates the absolute temperature.

However, since this prior art technology determines the pressure inside the combustion chamber by means of a pressure sensor, it is necessary to adapt the calculation to changes in the operational state of the engine, and hence the number of adaptation steps required is very large.

It is therefore an object of this invention to achieve suitable control of ignition timing by means of a small number of adaptation steps.

In order to achieve the above object, this invention provides an ignition timing control device for an internal combustion engine which causes an air/fuel mixture inside a cylinder to combust by means of ignition by a spark plug.

The device comprises a programmable controller programmed to calculate an ignition delay of the gas inside the cylinder on the basis of an operational state of the engine, calculate a knock generation index forming an indicator of the occurrence of knock, on the basis of the ignition delay, calculate a limit ignition timing at which knock is not generated, on the basis of the knock generation index, and control the ignition timing of the spark plug to the limit ignition timing at which knock is not generated.

This invention also provides an ignition timing control method for the internal combustion engine. The method comprises calculating an ignition delay of the gas inside the cylinder on the basis of an operational state of the engine, calculating a knock generation index forming an indicator of the occurrence of knock, on the basis of the ignition delay, calculating a limit ignition timing at which knock is not generated, on the basis of the knock generation index, and controlling the ignition timing of the spark plug to the limit ignition timing at which knock is not generated.

The details as well as other features and advantages of this invention are set forth in the remainder of the specification and are shown in the accompanying drawings.

DESCRIPTION OF THE PREFERRED EMBODIMENTS

Figure 1:
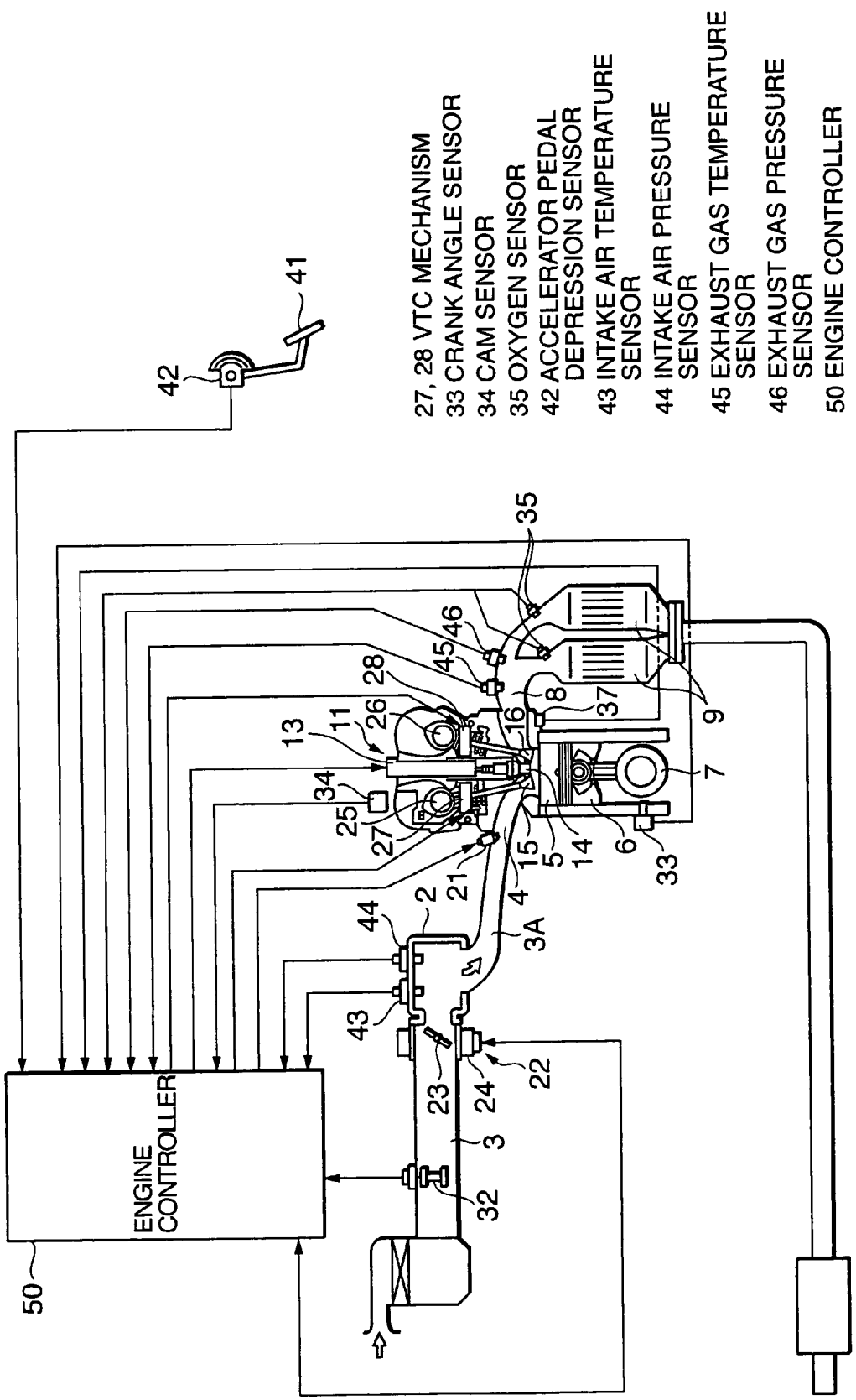
FIG. 1 is a schematic diagram of an ignition timing control device for an engine according to this invention.

Referring to FIG. 1 of the drawings, a multi-cylinder spark-ignition gasoline engine 1 for a vehicle aspirates air into a combustion chamber 5 of respective cylinders from an intake passage 3, via an intake collector 2 and an intake manifold 3A. An intake valve 15 and a fuel injector 21 are provided in an intake port 4 which connects the intake manifold 3A to the combustion chamber 5.

The combustion chamber 5 is connected via an exhaust valve 16 to an exhaust passage 8.

The combustion chambers 5 enlarge and contract in accordance with the reciprocal movement of pistons 6 which are connected to a common crank shaft 7. The engine 1 is a four-stroke cycle engine which repeats the four strokes of intake, compression, expansion and exhaust.

During the intake stroke, the intake valve 15 is opened, the piston 6 descends, with the exhaust valve 16 in a closed state, and air is aspirated into the combustion chamber 5 from the intake manifold 3A. The fuel injector 21 injects gasoline fuel into the air taken into the cylinder. The fuel mixes with the intake air to form an air/fuel mixture that is aspirated into the combustion chamber 5.

During the subsequent compression stroke, the intake valve 15 and the exhaust valve 16 are both closed, and the piston 6 rises. Consequently, the mixture enclosed inside the combustion chamber 5 is compressed.

The engine 1 comprises an ignition device 11 for igniting the compressed air/fuel mixture.

The ignition device 11 comprises an ignition coil 13 which stores electrical energy from a battery, a power transistor for switching the supply of power to the primary side of the ignition coil 13 on and off, and a spark plug 14 which faces into the combustion chamber 5 and produces an electrical spark discharge in accordance with the high voltage generated in the secondary side of the ignition coil 13 when the power to the primary side is switched off.

The spark plug 14 produces a spark discharge slightly before the top dead center point of the compression stroke, and the air/fuel mixture ignited by this spark combusts, the resulting flame spreads, and finally an explosion is produced.

In the subsequent expansion stroke, the pressure of the combusted gas pushes the piston 6 downwards, and thus causes the crank shaft 7 to rotate. The intake valve 15 and the exhaust valve 16 remain closed until the expansion stroke finishes.

In the subsequent exhaust stroke, the piston 6 rises again, the intake valve 15 remains closed, and the exhaust valve 16 opens. The rising piston 6 expels the combusted gas into the exhaust passage 8 through the exhaust valve 16. When the piston 6 reaches the top dead center, the four-stroke cycle is completed and the next four-stroke cycle starts. During two revolutions of the engine 1, the four-stroke cycle described above is performed once in each of the cylinders, at a prescribed phase difference between the cylinders.

The engine 1 has an electronic throttle 22 for regulating the flow rate of the intake air. The electronic throttle 22 comprises a throttle main body 23 provided in the intake passage 3 and a throttle motor 24 which drives the throttle main body 23.

A pair of three-way catalytic converters 9 each having a built-in three-way catalyst are provided in the exhaust passage 8 of the engine 1. Within a narrow range centered on the theoretical air/fuel ratio of the air/fuel mixture that is burnt, the three-way catalysts promote the oxidation of the hydrocarbons (HC) and carbon monoxide (CO) in parallel with recirculation of nitrogen oxides (NOx) in the exhaust gas, and hence they clean out these toxic components.

The intake valve 15 is driven by a cam installed on a cam shaft 25. The cam shaft 25 is coupled to the crank shaft 7 by means of a chain and a valve timing control (VTC) mechanism 27. The VTC mechanism 27 has a function of continually varying the opening and closing timing of the intake valve 15 in accordance with the angle of rotation of the crank shaft 7.

The exhaust valve 16 is driven by a cam installed on a cam shaft 26. The cam shaft 26 is coupled to the crank shaft 7 by means of a chain and a valve timing control (VTC) mechanism 28. The VTC mechanism 28 has a function of continually varying the opening and closing timing of the exhaust valve 16 in accordance with the angle of rotation of the crank shaft 7.

The degree of opening of the intake throttle 23, the amount of fuel injected by the fuel injector 21 and the injection timing, the control of the open and close timing of the intake valve by the VTC mechanism 27, the control of the open and close timing of the exhaust valve by the VTC mechanism 28, and the ignition timing of the spark plug 14 are all controlled by means of an engine controller 50.

The engine controller 50 is constituted by microcomputer comprising: a central processing unit (CPU), a read-only memory (ROM), a random access memory (RAM) and an input/output interface (I/O interface). It is possible to constitute the engine controller 50 by means of a plurality of microcomputers.

Various detection values are input to the engine controller 50 as input signals. These detection values are supplied by an airflow meter 32 that detects the flow rate of the intake air in the engine 1, a crank angle sensor 33 that detects a rotation speed and a rotation position of the crank shaft 7, a cam sensor 34 that detects a rotation position of the intake cam, an accelerator pedal depression sensor 42 that detects an amount of depression of an accelerator pedal 41, a pair of oxygen sensors 35 that detects an oxygen concentration of the exhaust gas in the exhaust passage 8 at a position upstream of the three-way catalytic converters 9, an intake temperature sensor 43 that detects a temperature of the intake air in the intake collector 2, an intake pressure sensor 44 that detects a pressure of the intake air inside the air intake collector 2, an exhaust temperature sensor 45 that detects an exhaust temperature in the exhaust passage 8 at a position upstream of the three-way catalytic converters 9, and an exhaust pressure sensor 46 that detects an exhaust pressure in the exhaust passage 8 at a position upstream of the three-way catalytic converters 9.

The engine controller 50 controls the degree of opening of the intake throttle 23 in the following manner.

The engine controller 50 specifies a target torque on the basis of a signal from the accelerator pedal depression sensor 42, and then specifies a target air volume in order to achieve this target torque. The engine controller 50 controls the degree of opening of the throttle 23, via the throttle motor 24, in such a manner that this target air volume is obtained.

The engine controller 50 controls the intake valve open and close timings by the VTC mechanism 27, and the exhaust valve open and close timings by the VTC mechanism 28, in the following manner.

When the open and close timings of the intake valve 15 and the open and close timings of the exhaust valve 16 are altered, the amount of inert gas remaining inside the combustion chamber 5 changes accordingly. The greater the amount of inert gas inside the combustion chamber 5, the lower the pumping loss and the lower the fuel consumption. A desirable residual amount of inert gas in the combustion chamber 5 is set previously in accordance with the rotation speed and the load of the engine 1. When the residual amount of inert gas has been determined, the close timing of the intake valve 15 and the close timing of the exhaust valve 16 are determined. Here, the engine controller 50 decides target close timings for the intake valve 15 and the exhaust valve 16 in accordance with the rotation speed of the engine 1 as measured by the crank angle sensor 33, and the amount of depression of the accelerator pedal, which represents the engine load, as determined by the accelerator pedal depression sensor 42. The engine controller 50 controls the VTC mechanisms 27 and 28 in such a manner that these target close timings are achieved.

The engine controller 50 controls the injection of fuel by the fuel injector 21 in the following manner.

The engine controller 50 calculates the volume of air to be taken in to each cylinder during a four-stroke cycle of the engine 1, in other words, at every 720° revolution of the engine 1, from the intake air volume measured by the air flow meter 32.

In order that the three-way catalytic converters 9 display desirable reaction efficiency, it is necessary to maintain the air/fuel ratio in the vicinity of the stoichiometric air/fuel ratio. Therefore, the engine controller 50 calculates a target fuel injection volume from the air intake volume, in such a manner that the air/fuel mixture has a target air/fuel ratio, which is set in the vicinity of the theoretical air/fuel ratio. The engine controller 50 controls the amount of fuel injected by the fuel injector 21 on the basis of the target fuel injection amount, while at the same time, it calculates the actual air/fuel ratio of the combusted air/fuel mixture, from the oxygen concentration in the exhaust gas as determined by the oxygen sensor 35. The engine controller 50 performs a feedback correction of the target fuel injection amount, in such a manner that the actual air/fuel ratio coincides with the target air/fuel ratio.

The engine controller 50 controls the injection timing of the respective fuel injectors 21 on the basis of the crank angle determined by the crank angle sensor 33 and the angle of rotation of the cam as determined by the cam sensor 34, in such a manner that fuel is injected into each cylinder at the prescribed target injection timings.

The engine controller 50 controls the ignition timing of the spark plug 14 in the following manner.

The engine controller 50 determines a target ignition timing set slightly before the top dead center of the compression in each cylinder, on the basis of the crank angle as determined by the crank angle sensor 33 and the angle of rotation of the cam as determined by the cam sensor 34. In each cylinder, the spark plug 14 is caused to spark at the respective target ignition timing, by shutting off the primary current in the ignition coil 13, via the power transistor of the ignition device 11.

Next, a process for determining the target ignition timing, which is the subject matter of this invention, will be described.

Firstly, an overview of a target ignition timing specification process will be described with reference to FIGS. 2A–2D and FIGS. 3A and 3B. In FIGS. 2A–2D, the position of the vertical axis corresponds to the compression top dead center (CTDC).

Figure 2A:
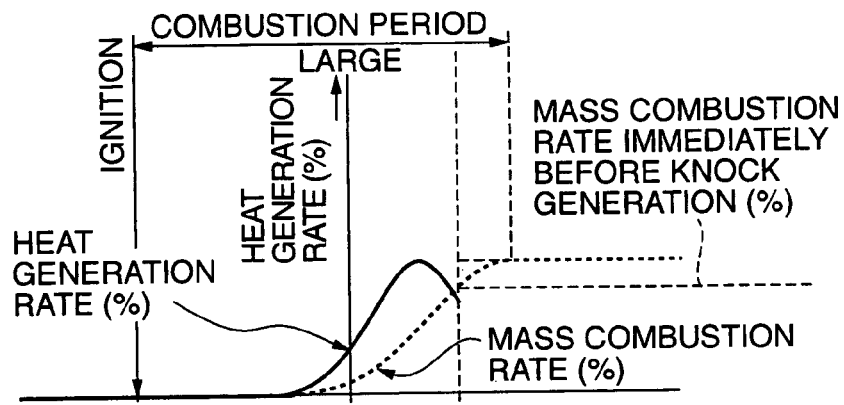
FIGS. 2A–2D are timing charts illustrating a combustion knock generation mechanism.
Figure 2B:

When combustion of the air/fuel mixture starts due to the ignition by the spark plug 14, the heat generation rate increases sharply, as shown in FIG. 2A. Furthermore, the internal temperature of the cylinder shown in FIG. 2B and the internal pressure in the cylinder shown in FIG. 2C also increase.

Figure 2C:
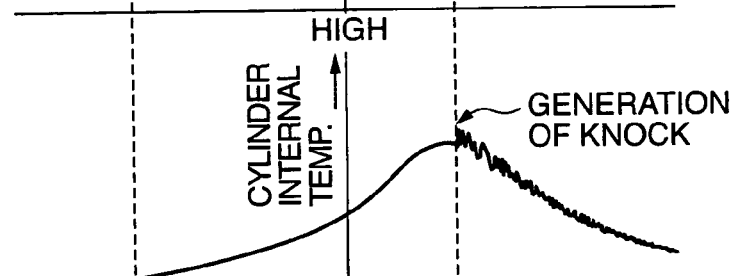

Here, if preignition of the compressed air/fuel mixture occurs due to the heat of compression, before the flame created by the ignition has propagated, then so-called "combustion knock" occurs in the engine 1, and the internal pressure of the cylinder fluctuates as shown in FIG. 2C. Combustion knock damages the engine 1, and therefore the engine controller 50 performs knock control by controlling the ignition timing of the spark plugs 14, in order to prevent combustion knock.

The time required until a compressed air/fuel mixture reaches self ignition due to the heat of compression is called a self ignition period tau. This self ignition period tau is expressed as a factor of the ignition temperature and the pressure. The inverse of the self ignition period, namely, $1/\text{tau}$, is called an ignition delay.

Figure 2D:
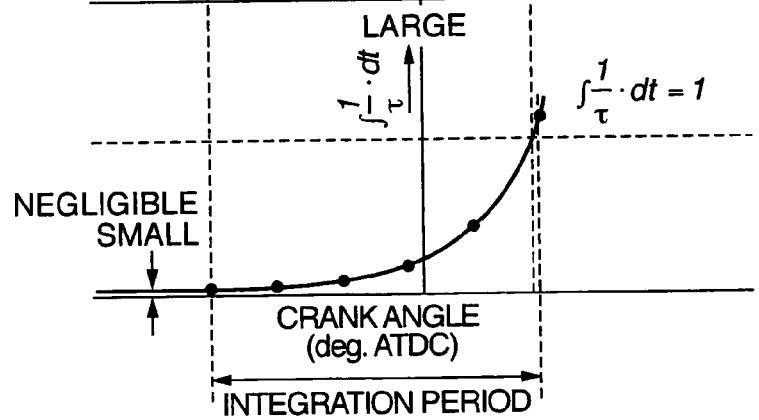

As illustrated in FIG. 2D, the inventors discovered that combustion knock occurs when a time integral $\int 1/\tau \cdot dt$ of the ignition delay $1/\tau$ becomes 1.

Figure 3:
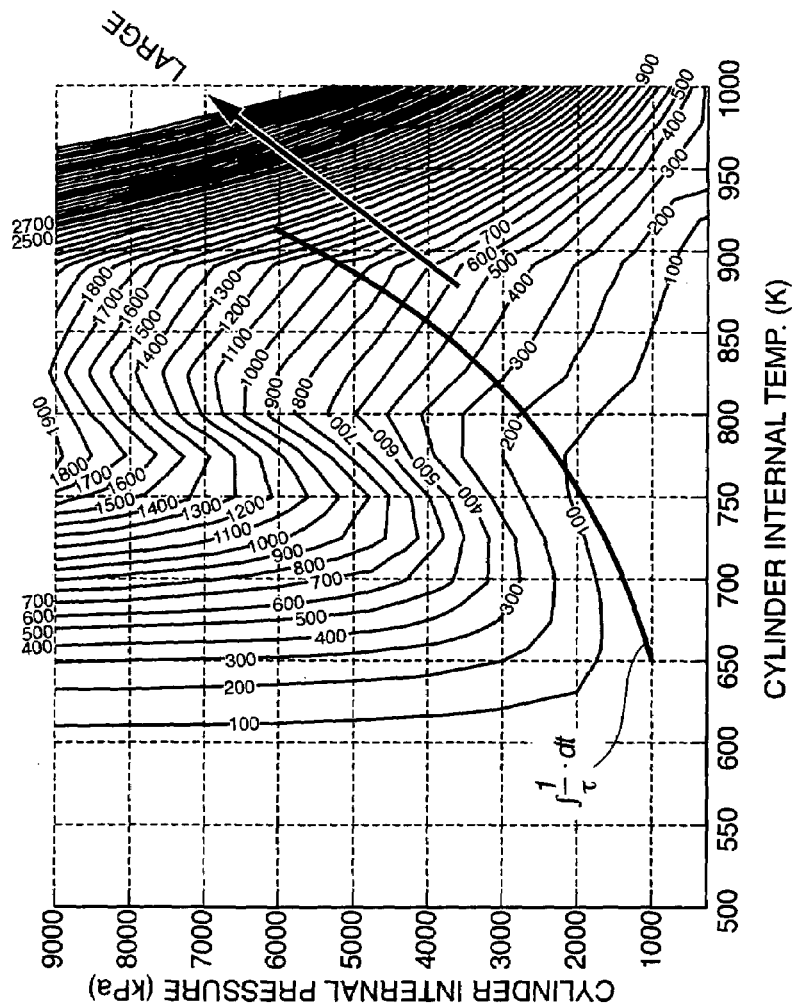
FIG. 3 is a diagram illustrating the characteristics of a map of a knock generation index according to this invention.

FIG. 3 is a map showing the variation in the ignition delay $1/\tau$ during the compression stroke, as a factor of the temperature in the cylinder and the pressure in the cylinder. The ignition delay $1/\tau 0$ is indicated by the thick curve. Integrating this curve by time gives the time integral value $\int 1/\tau \cdot dt$.

Here, the time integral is equivalent to 1 at the upper right-hand end of the curve. In the following description, the time integral $\int 1/\tau \cdot dt$ is called the knock generation index.

Figure 4:
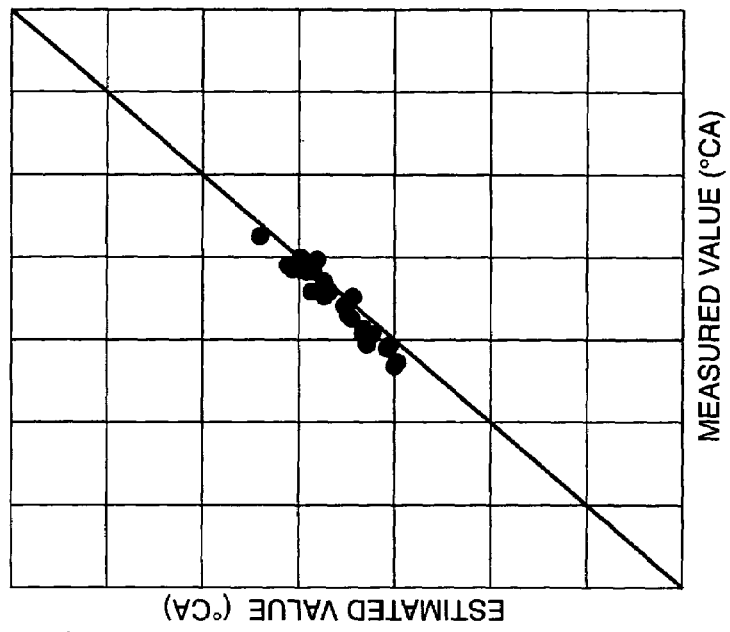
FIG. 4 is a diagram for comparing a combustion knock generation timing estimated on the basis of the knock generation index and an actual measured value for the combustion knock generation timing.

FIG. 4 shows the results of a comparison made by the inventors between a combustion knock timing estimated by means of the aforementioned method and a combustion knock timing actually measured using a knock sensor. As the diagram shows, the method of estimating the combustion knock timing on the basis of a knock generation index coincides almost completely with the actually measured combustion knock timing.

The knock generation index is set on the basis of the pressure in the cylinder and the temperature in the cylinder, as shown in FIG. 3A. The pressure and temperature in the cylinder are the most essential quantities relating to the state of the gas in a cylinder of an engine, and therefore a knock generation index $\int 1/\tau \cdot dt$ determined by these factors has almost uniform characteristics, regardless of the type of engine.

Since factors such as the warm-up state of the engine or the environmental conditions have virtually no effect at all, it is possible to estimate the combustion knock timing in real time, with a high degree of accuracy, by using the knock generation index.

Next, referring to FIG. 5, the control of ignition timing based on a knock generation index $\int 1/\tau \cdot dt$ according to this invention will be described. All of the blocks shown in this figure are virtual units for the purpose of describing the function of the controller 50, and do not exist as physical entities.

Figure 5:
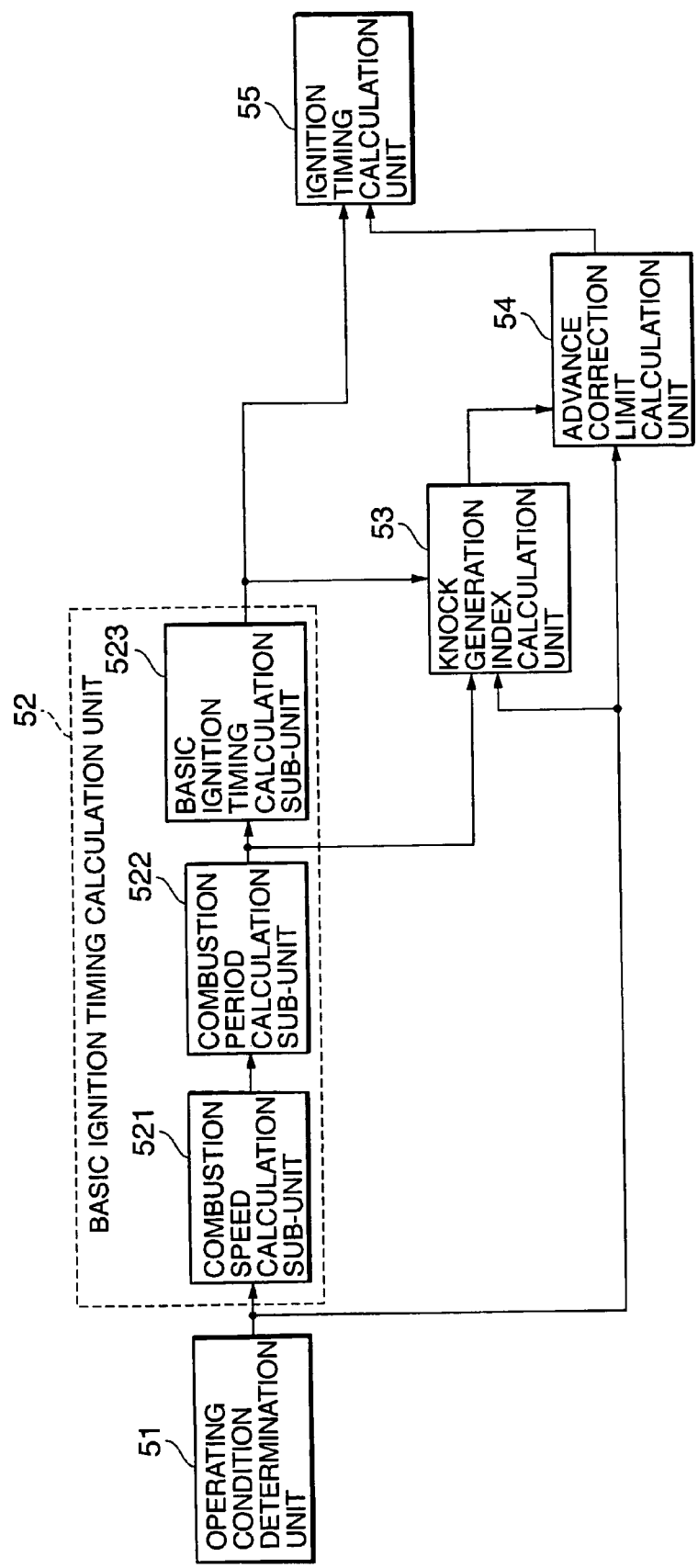
FIG. 5 is a block diagram showing an overview of ignition timing control according to this invention.

Referring to FIG. 5, an operating condition determination unit 51 determines parameters relating to the operating conditions of the engine 1, and a basic ignition timing calculation unit 52 calculates a basic ignition timing MBTCAL for the fuel injector 21 on the basis of these parameters. The basic ignition timing calculation unit 52 comprises a combustion speed calculation sub-unit 521, a combustion period calculation sub-unit 522, and a basic ignition timing calculation sub-unit 523.

U.S. Pat. No. 6,557,526 discloses a method for calculating the combustion speed, the combustion period and the basic ignition timing for an air/fuel mixture in the case of normal combustion in a combustion chamber, on the basis of the operating conditions of the engine 1. The operating condition determination unit 51 and the basic ignition timing calculation unit 52 comprising the combustion speed calculation sub-unit 521, the combustion period calculation sub-unit 522, and the basic ignition timing calculation sub-unit 523, apply this known calculation method to calculate each item.

The basic ignition timing MBTCAL calculated by the basic ignition timing calculation unit 52 corresponds to the Minimum Advance for Best Torque (MBT) in U.S. Pat. No. 6,557,526.

A knock generation index calculation unit 53 calculates the knock generation index.

An advance correction limit calculation unit 54 calculates a crank angle at which the knock generation index becomes 1. This crank angle corresponds to an advance correction limit for the ignition timing.

Figure 6:
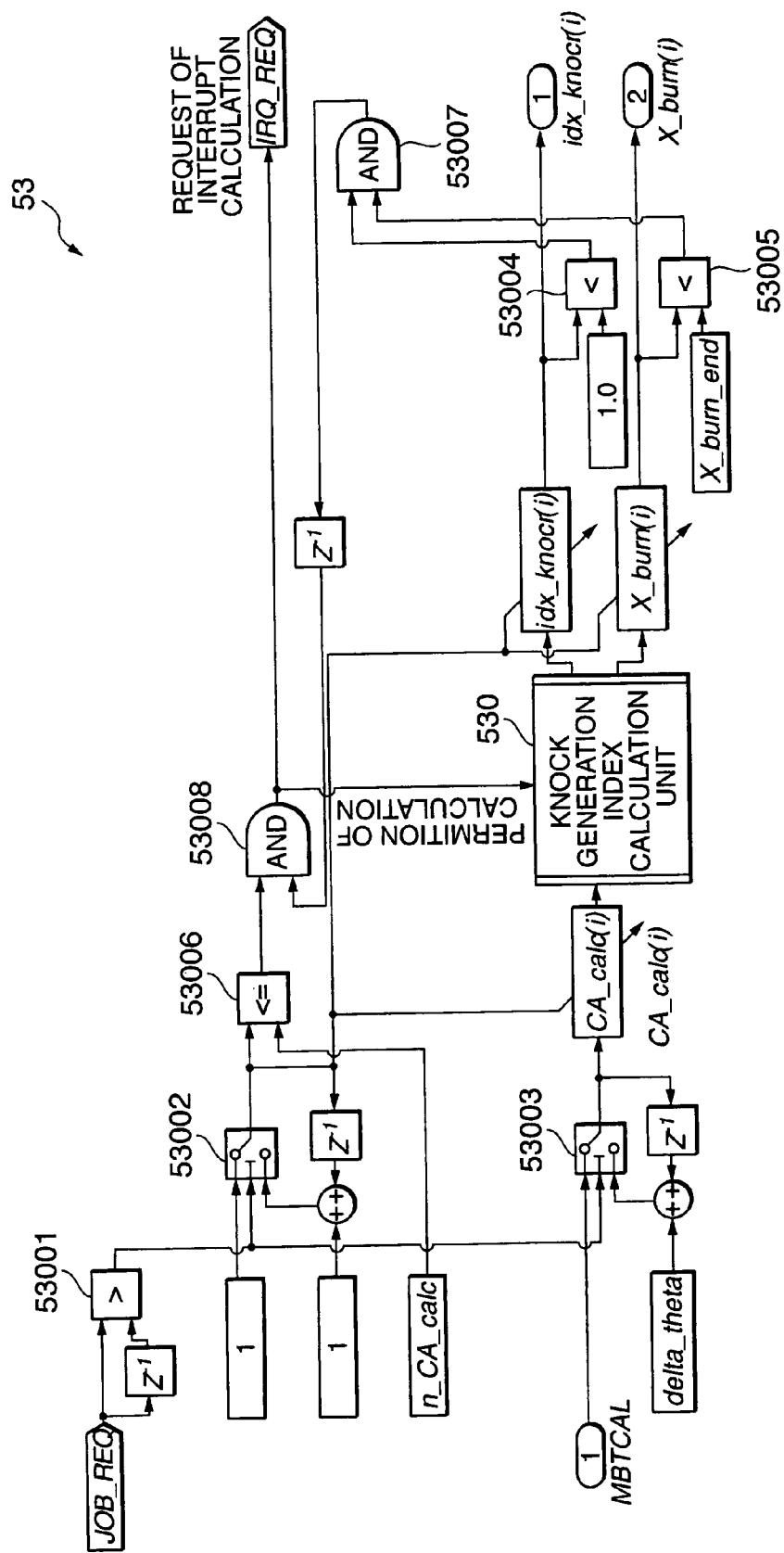
FIG. 6 is a block diagram showing the composition of a knock generation index calculation unit according to this invention.

Referring to FIG. 6, the composition of the knock generation index calculation unit 53 will be described. The engine controller 50 implements a calculation process as described below at intervals of a predetermined crank angle delta_theta during operation of the engine 1.

The basic ignition timing MBTCAL, the crank angle interval delta_theta, and a knock generation index calculation start request JOB_REQ are input to the knock generation index calculation unit 53.

The knock generation index calculation start request JOB_REQ is a boolean value, and when the crank angle coincides with the basic ignition timing MBTCAL, it changes from an initial value of zero to unity.

The knock generation index calculation unit 53 comprises comparators 53001, 53004, 53005 and 53006, a counter 53002, a crank angle calculation block 53003, AND circuits 53007 and 53008, and a knock generation index calculation block 530.

The knock generation index calculation start request JOB_REQ is input to the comparator 53001. At the same time, the previous value of the knock generation index calculation start request JOB_REQ stored in a memory of the engine controller 50 is input to the comparator 53001. The value $Z^{-1}$ in the diagram indicates the previous value.

The comparator 53001 compares the knock generation index calculation start request JOB_REQ with the previous value, and if the previous value is greater than the knock generation index calculation start request JOB_REQ, then it outputs a value of unity and otherwise, it outputs a value of zero. In this diagram, the input values to the comparator 53001 are indicated by two parallel arrows. Of these, the input value represented by the upper arrow is put on the left-hand side of the inequality symbol, and the input value represented by the lower arrow is put on the right-hand side of the inequality symbol.

The aforementioned relationship is also used for the input values and the comparison processes in the other comparators.

The output from the comparator 53001 is only unity in cases where the knock generation index calculation start request JOB_REQ is unity, and the previous value $Z^{-1}$ is zero, in other words, when the knock generation index calculation start request is first issued. If the knock generation index calculation start request JOB_REQ remains at unity, then the output of the comparator 53001 becomes zero.

The counter 53002 outputs a value of 1 if the comparison result from the comparator 53001 is unity. If the output from the comparator 53001 is zero, then the counter 53002 outputs a value obtained by adding a value of 1 to the previous output value of the counter 53002. Therefore, if the knock generation index calculation start request JOB_REQ continues in a state of unity, the output value i of the counter 53002 is incremented by a value of 1, each time the calculation process is carried out.

The crank angle calculation block 53003 outputs the basic ignition timing MBTCAL as an initial value for the crank angle CA_calc, when the output of the comparator 53001 is unity. If the output of the comparator 53001 is zero, then the crank angle calculation block 53003 adds the crank angle interval delta_theta to the previous value of the crank angle $Z^{-1}$ and outputs the resulting value as the crank angle CA_calc. In other words, as long as the output of the comparator 53001 continues at zero, the crank angle calculation block 53003 increments the crank angle CA_calc by the crank angle interval delta_theta each time the engine controller 50 implements the calculation process.

The crank angle CA_calc and the counter output value i are input to the knock generation index calculation block 530 as a processed crank angle CA_calc(i).

The knock generation index calculation block 530 calculates a knock generation index $\int 1/\tau \cdot dt$ and a mass combustion rate X_burn from the processed crank angle CA_calc(i).

The calculation involved is described later in detail. The calculation results of the knock generation index calculation block 530 are output in the form of a knock generation index combined with the counter output value i, idx_knocr(i), and the mass combustion rate X_burn(i).

The comparator 53004 compares the knock generation index idx_knocr(i) with the value of 1.0. If the knock generation index idx_knocr(i) is less than 1.0, then the comparator 53004 outputs a value of unity. If the knock generation index idx_knocr(i) has reached 1.0, then it outputs a value of zero.

The comparator 53005 compares the mass combustion rate X_buirn(i) with the combustion rate at end of combustion X_burn_end. The combustion rate at end of combustion X_burn_end is herein set to 60 percent. If the mass combustion rate X_buirn(i) is less than the combustion rate at end of combustion X_burn_end, then the comparator 53005 outputs a value of unity. If the mass combustion rate X_buirn(i) has reached the combustion rate at end of combustion X_burn_end, then it outputs a value of zero.

The outputs of the comparators 53004 and 53005 are processed by the AND circuit 53007. The AND circuit 53007 outputs a value of unity if the outputs of the comparators 53004 and 53005 are both unity, and it outputs a value of zero if either of these outputs is zero. The output of the AND circuit 53007 is stored in the ROM of the engine controller 50.

On the other hand, the comparator 53006 compares the output value i of the counter 53002 with a predetermined number of crank angle calculations n_CA_calc. The comparator 53006 outputs a unity value, if the counter value i is less than the number of crank angle calculations n_CA_calc. If the counter value i has reached the number of crank angle calculations n_CA_calc, then it outputs a value of zero.

If the input signal from the comparator 53006 and the previous output value of the AND circuit 53007 as stored in the RAM are both zero, then the AND circuit 53008 outputs an interrupt calculation request to the engine controller 50, and outputs a calculation permission to the knock generation index calculation block 530. If either the input signal from the comparator 53006 or the previous output value of the AND circuit 53007 stored in the RAM assumes a unity value, then the AND circuit 53008 ceases to output the interrupt calculation request and calculation permission.

As a result of the process described above, if the knock generation index calculation start request JOB_REQ changes from zero to unity when the crank angle coincides with the basic ignition timing MBTCAL, then the knock generation index calculation block 530 calculates a knock generation index idx_knocr(i) and mass combustion rate X_buirn(i) at the predetermined crank angle intervals delta_theta, and the knock generation index calculation unit 53 outputs these values. In the initial stage of the calculation process, the value of the knock generation index idx_knocr(i) is less than 1.0, the mass combustion rate. X_buirn(i) is less than the combustion rate at end of combustion X_burn_end, and the output value i of the counter 53002 is less than the predetermined number of crank angle calculations n_CA_calc.

Therefore, the output signal of the AND circuit 53008 is unity, and on the basis of the interrupt calculation request and the calculation permission supplied to the knock generation index calculation block 530, a knock generation index idx_knocr(i) and mass combustion rate X_buirn(i) are calculated and output at the predetermined crank angle intervals delta_theta.

When either one of the previous value of the knock generation index idx_knocr(i), the previous value of the mass combustion rate X_buirn(i), and the output value i of the counter 53002 reaches its comparison value, one of the inputs to the AND circuit 53008 changes from zero to unity. Consequently, the AND circuit 53008 ceases to output the calculation request and calculation permission.

Next, referring to FIG. 7, the calculation of the knock generation index idx_knocr(i) and the mass combustion rate X_buirn(i) performed by the knock generation index calculation block 530 will be described.

The knock generation index calculation block 530 comprises an average cylinder temperature and pressure calculation block 531 and a knock generation index output block 532.

The following values are input to the average cylinder temperature and pressure calculation block 531: the crank angle CA, the engine speed NE, the basic ignition timing MBTCAL, the fuel injection pulse width TP, the initial value of the cylinder volume V_cyl_ini, the initial value of the cylinder temperature T_cyl_ini, the initial value of the cylinder pressure P_cyl_ini, the ignition dead time IGNDEAD, the combustion period BURN, the reference combustion rate X_ref, and the residual gas ratio MRESFR.

The crank angle determined by the crank angle sensor 33 is used as the crank angle CA. The engine rotation speed determined by the crank angle sensor 33 is used as the crank speed NE. The fuel injection pulse width TP is calculated in accordance with the air intake flow rate Q measured by the air flow meter 32, and the engine speed NE determined by the crank angle sensor 33. A commonly known calculation method as disclosed in U.S. Pat. No. 5,345,921 described above is used for this calculation.

The initial value of the cylinder volume, V_cyl_ini, indicates the volume of the cylinder at the basic ignition timing MBTCAL. The initial value of the cylinder volume V_cyl_ini is previously determined by means of a commonly known calculation method as disclosed in U.S. Pat. No. 6,557,526 described above. The initial value of the cylinder volume V_cyl_ini corresponds to the initial value of the cylinder volume VIVC as defined in U.S. Pat. No. 6,557,526. In the following description, the initial value of the cylinder volume V_cyl_ini is treated as a fixed value.

The initial value of the cylinder temperature, T_cyl_ini, indicates the temperature in the cylinder at the basic ignition timing MBTCAL. The initial value of the cylinder temperature T_cyl_ini is previously determined by means of a commonly known calculation method as disclosed in U.S. Pat. No. 6,557,526 described above. The initial value of the cylinder temperature T_cyl_ini corresponds to the initial value of the cylinder temperature TINI as defined in U.S. Pat. No. 6,557,526.

The initial value of the cylinder pressure, P_cyl_ini, indicates the pressure of the cylinder at the basic ignition timing MBTCAL. The initial value of the cylinder pressure P_cyl_ini is calculated from the initial cylinder volume V_cyl_ini and the initial cylinder temperature T_cyl_ini.

The ignition dead time IGNDEAD indicates the time from the output of an ignition signal by the engine controller 50 until actual ignition of the spark plug 14. The ignition dead time IGNDEAD depends on the engine speed NE, and it is determined by means of a commonly known calculation method as disclosed in U.S. Pat. No. 6,557,526.

The combustion period BURN is the sum of the initial combustion period BT1 and the main combustion period BT2 as disclosed in U.S. Pat. No. 6,557,526.

The reference combustion rate X_ref corresponds to the reference combustion rate R2 disclosed in U.S. Pat. No. 6,557,526. The reference combustion rate R2 is 60% by weight.

The residual gas ratio MRESFR indicates the ratio of inert gas remaining in the burnt air/fuel mixture. The residual gas ratio MRESFR is determined by means of a commonly known calculation method as disclosed in U.S. Pat. No. 6,557,526. The residual gas ratio MRESFR corresponds to the residual gas ratio EGRREM as disclosed in U.S. Pat. No. 6,557,526.

The contents of U.S. Pat. No. 6,557,526 are hereby incorporated by reference for the above calculation.

Figure 8:
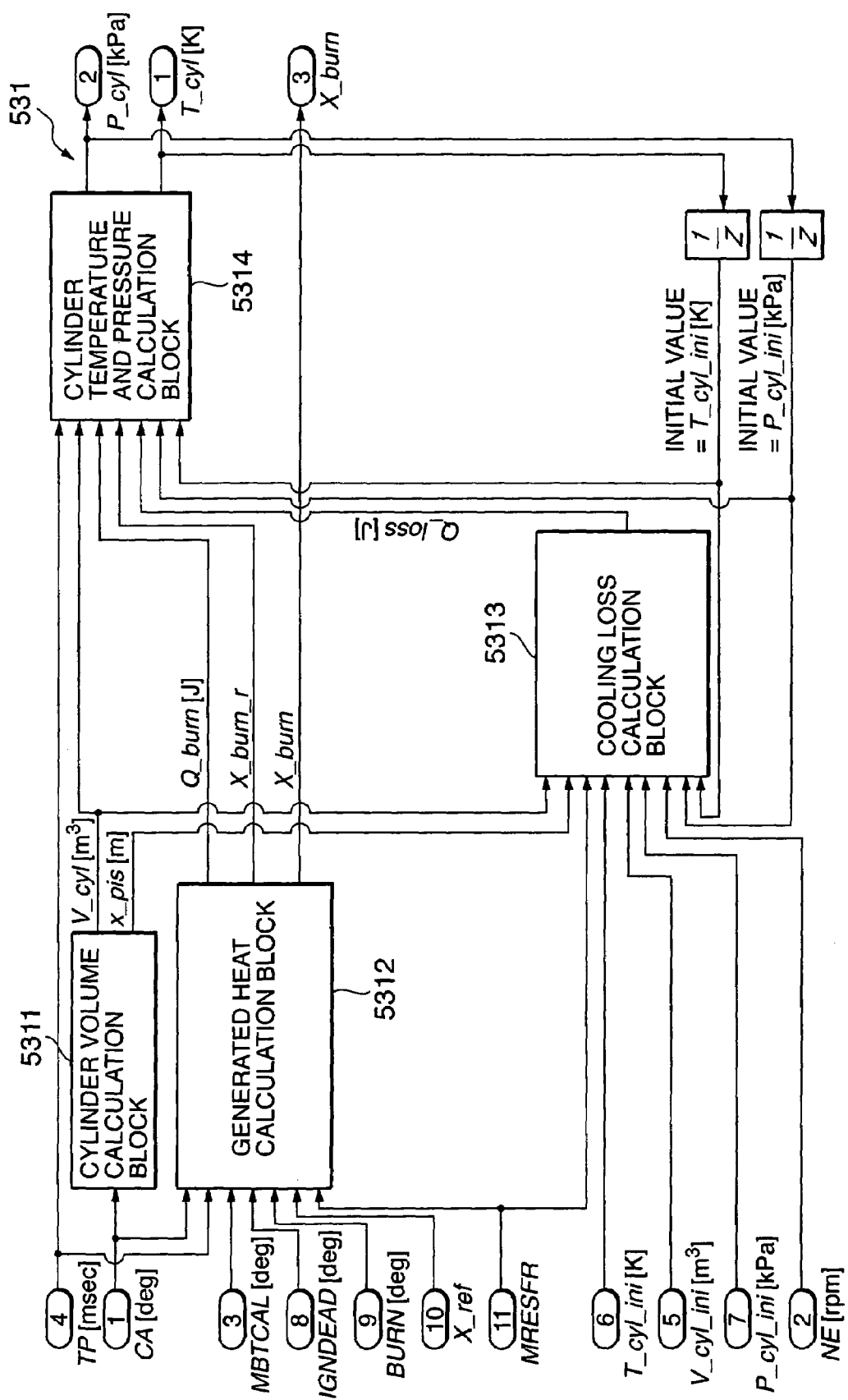
FIG. 8 is a block diagram showing the composition of an average cylinder temperature and pressure calculation block according to this invention.

Referring to FIG. 8, the average cylinder temperature and pressure calculation block 531 comprises a cylinder volume calculation block 5311, a generated heat calculation block 5312, a cooling loss calculation block 5313, and a cylinder temperature and pressure calculation block 5314.

The cylinder volume calculation block 5311 calculates the cylinder volume V_cyl and the piston displacement x_pis, on the basis of the crank angle CA.

Figure 9:
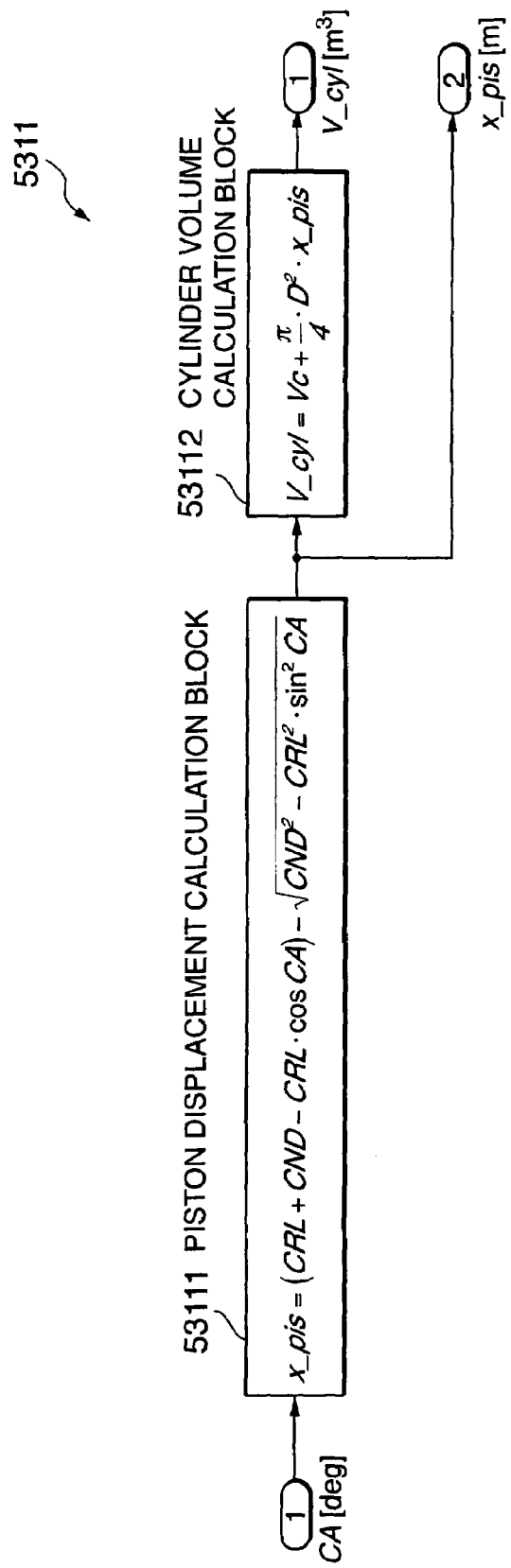
FIG. 9 is a block diagram showing the composition of a cylinder volume calculation block according to this invention.

Referring to FIG. 9, the cylinder volume calculation block 5311 comprises a piston displacement calculation block 53111 and a cylinder volume calculation block 53112. The piston displacement calculation block 53111 calculates the piston displacement x_pis from the crank angle CA by means of the following equation (1).

$$x\_pis = (CRL + CND - CRL \cdot \cos CA) - \sqrt{CND^2 - CRL^2 \cdot \sin^2 CA} \quad (1)$$

where,

CRL=the length of the crank shaft,

CND=the length of the connecting rod, and

CND=length of connecting rod.

The cylinder volume calculation block 53112 calculates the cylinder volume V_cyl using the following equation (2).

$$V\_cyl = Vc + \frac{\pi}{4} \cdot D^2 \cdot x\_pis \quad (2)$$

where,

Vc=gap volume (m3), and

D=diameter of cylinder bore (m).

Referring back to FIG. 8, the generated heat calculation block 5312 calculates the heat generation rate Q_burn, the mass combustion rate for calculating properties X_burn_r, and the mass combustion rate X_burn, from the crank angle CA, the fuel injection pulse width TP, the basic ignition timing MBTCAL, the ignition dead time IGNDEAD, the combustion period BURN, the reference combustion rate X_ref, and the residual gas ratio MRESFR.

Figure 10:
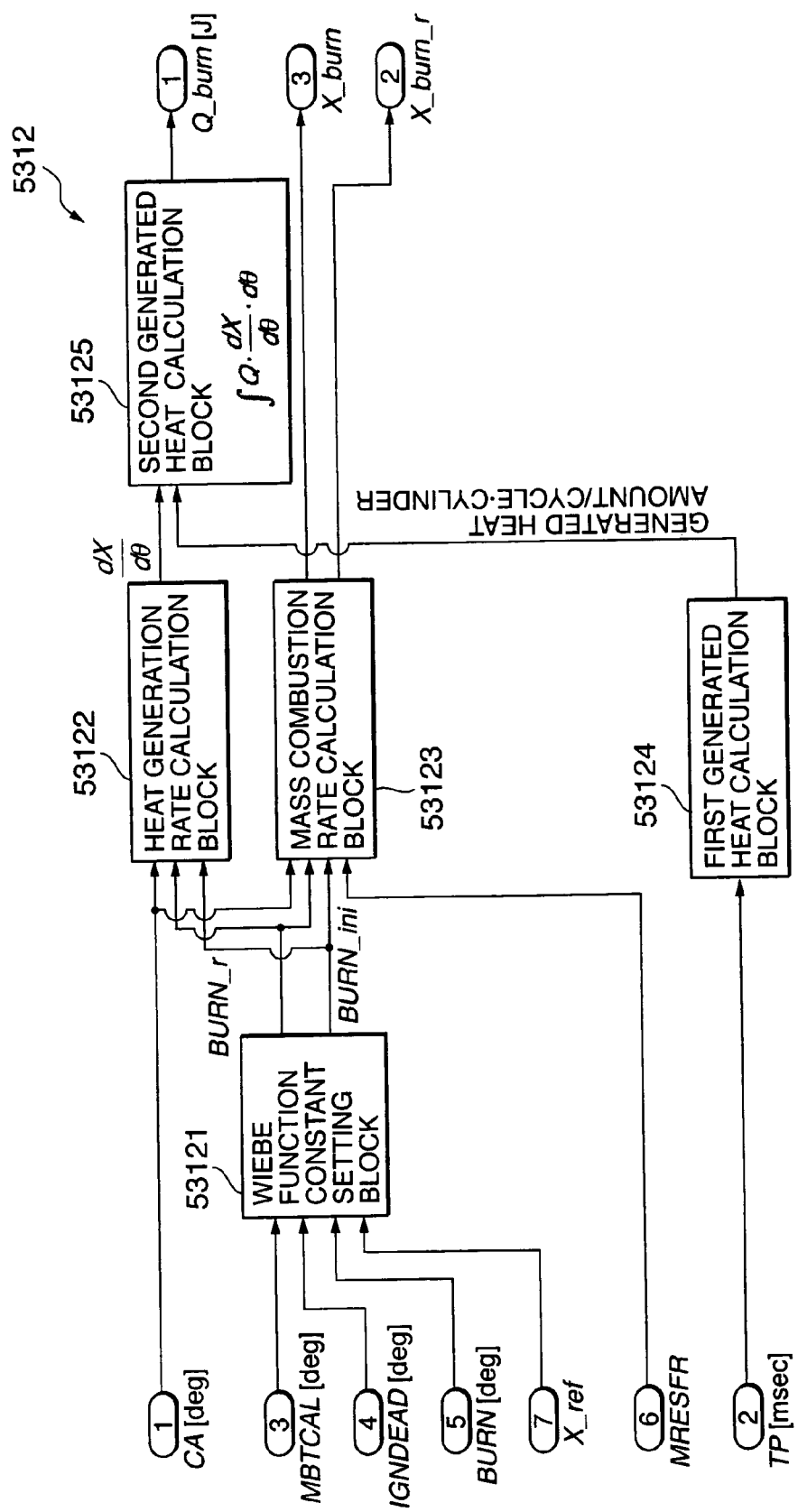
FIG. 10 is a block diagram showing the composition of a generated heat calculation block according to this invention.

Referring to FIG. 10, the generated heat calculation block 5312 comprises a Wiebe function constant setting block 53121, a heat generation rate calculation block 53122, a mass combustion rate calculation block 53123, a first generated heat calculation block 53124 for calculating the amount of heat generated per cylinder per cycle, and a second generated heat calculation block 53125 for calculating the amount of heat generated per cylinder per calculation interval.

Firstly, the Wiebe function used by the Wiebe function constants setting block 5312 will be described.

The mass combustion rate X(%) which indicates the characteristics of the heat generation rate can be expressed in the form of the following equation (3), as a function of the crank angle θ (degree).

$$X = 1 - \exp\left\{-a \cdot \left(\frac{\theta - \theta s}{\theta_B}\right)^{n+1}\right\} \quad (3)$$

where,

θs=crank angle at actual start of combustion (degree), $\theta_B$=actual combustion period (degree), and a, n=constants.

The constants a, n are dependent on the type of engine, namely, the shape of the combustion chamber 5, the position of the spark plug 14, the gas flow characteristics inside the combustion chamber 5, and the like. The constants a, n can be determined previously by experimentation. Equation (3) represents a Wiebe function.

When equation (3) is differentiated with respect to the crank angle θ, the following equation (4) indicating the heat generation rate is obtained.

$$\frac{dX}{d\theta} = \frac{a \cdot (n+1)}{\theta_B} \cdot \left(\frac{\theta - \theta s}{\theta_B}\right)^n \cdot \exp\left\{-a \cdot \left(\frac{\theta - \theta s}{\theta_B}\right)^{n+1}\right\} \quad (4)$$

When equation (4) is solved with respect to the actual combustion period $\theta_B$, the following equation (5) is obtained.

$$\theta_B = \frac{\theta}{\left\{\frac{-\log(1-X)}{a}\right\}^{\frac{1}{n+1}}} \quad (5)$$

Figure 11:
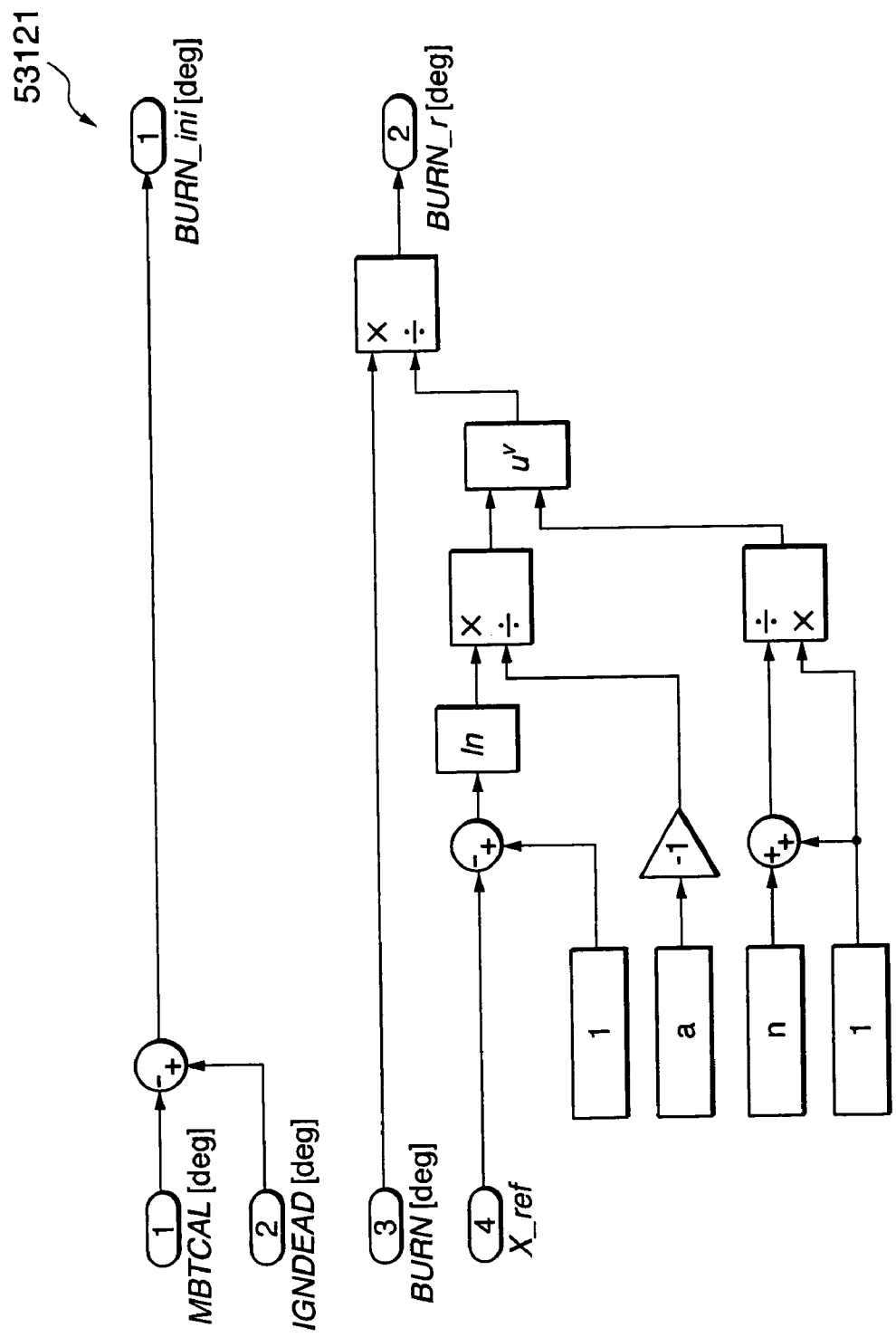
FIG. 11 is a block diagram illustrating a process for calculating a heat generation start timing BURN_ini and an actual combustion period BURN_r, as implemented by a Wiebe function constant setting block according to this invention.

Referring to FIG. 11, the Wiebe function constant setting block 53121 calculates the heat generation start timing BURN_ini, by adding the ignition dead time IGNDEAD to the basic ignition timing MBTCAL. Furthermore, the value of $\theta_B$ obtained when θ=BURN, X=X_ref are substituted into equation (5) is calculated as the actual combustion period BURN_r. The heat generation start timing BURN_ini and the actual combustion period BURN_r are generally known as the heat generation pattern.

Figure 12:
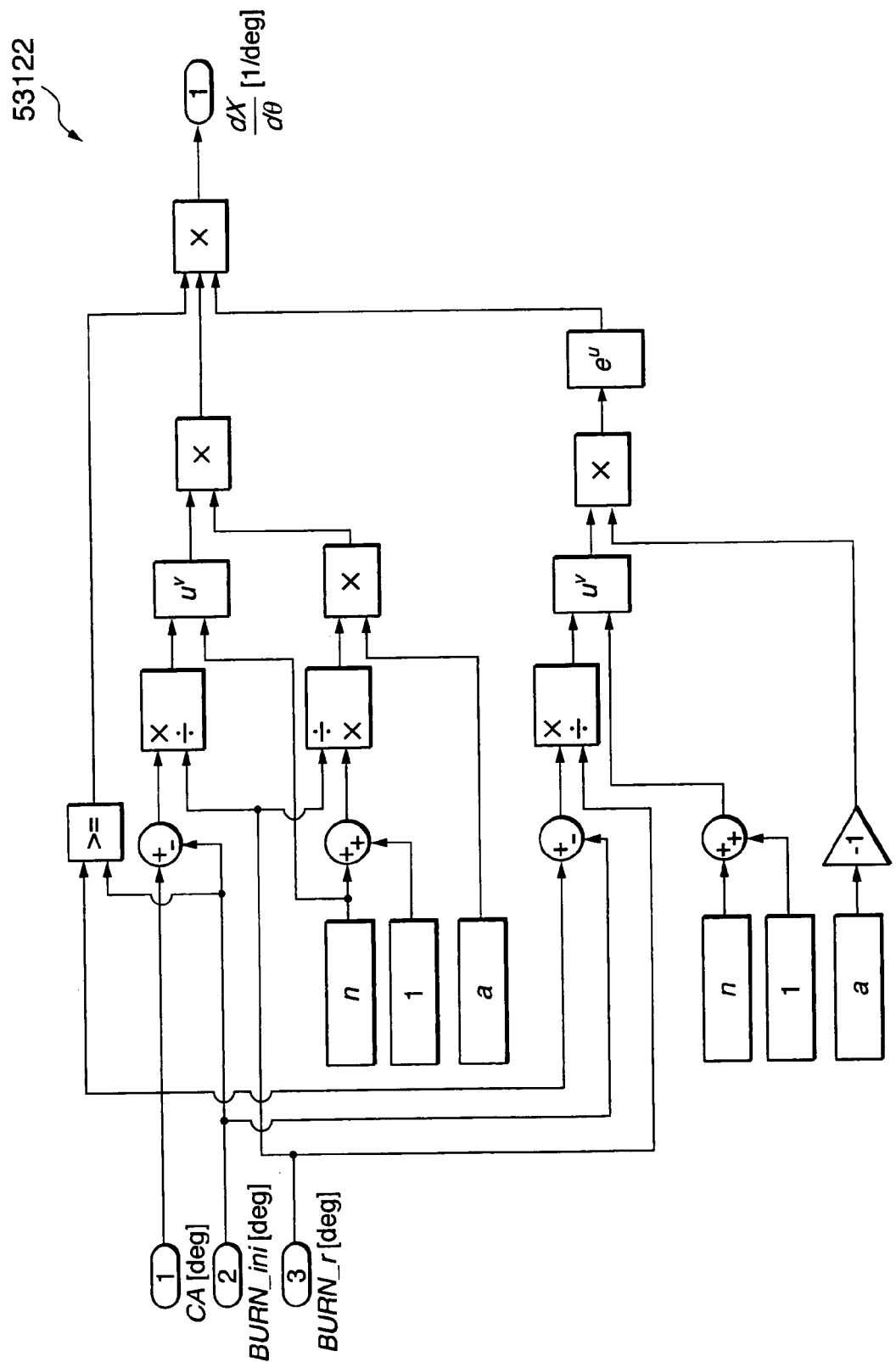
FIG. 12 is a block diagram illustrating a process for calculating a heat generation rate, as implemented by a heat generation rate calculation block according to this invention.

Referring to FIG. 12, the heat generation rate calculation block 53122 derives the heat generation rate $$\frac{dX}{d\theta}$$

from the crank angle CA, the heat generation start timing BURN_ini, and the actual combustion period BURN_r, by substituting values into equation (4) as follows: θ=CA, θs=BURN_ini, and $\theta_B$=BURN_r.

Figure 13:
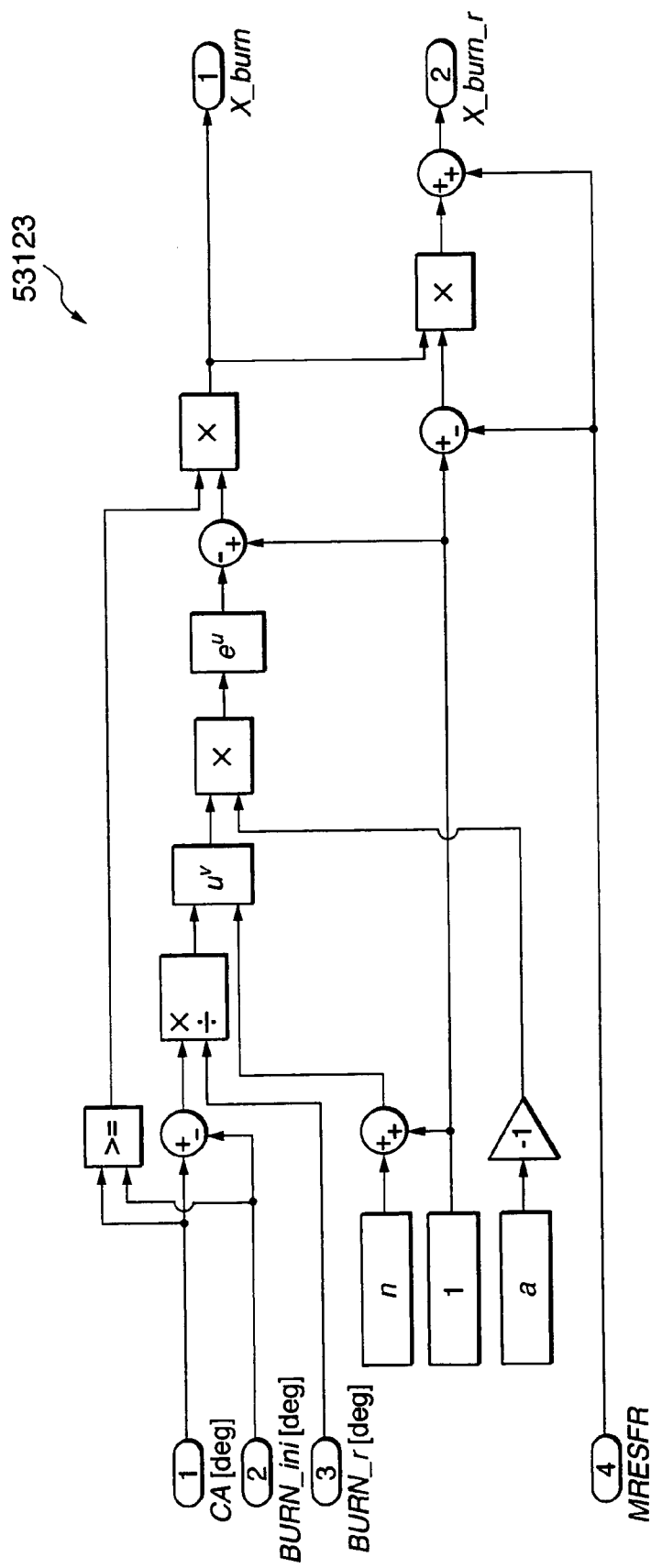
FIG. 13 is a block diagram illustrating a process for calculating a mass combustion rate X_burn and a mass combustion rate for calculating properties X_burn_r, as implemented by a mass combustion rate calculation block according to this invention.

Referring to FIG. 13, the mass combustion rate calculation block 53123 determines the mass combustion rate X_burn, and the mass combustion rate for calculating properties X_burn_r, by calculating equation (3) on the basis of the crank angle CA, the heat generation start timing BURN_ini, the actual combustion period BURN_r, and the residual gas ratio MRESFR.

The mass combustion rate X_burn is a value which does not take account of the inert gas remaining in the combustion mixture, and the mass combustion rate for calculating properties X_burn_r is a mass combustion rate which does take account of the inert gas remaining in the combustion mixture.

Figure 14:
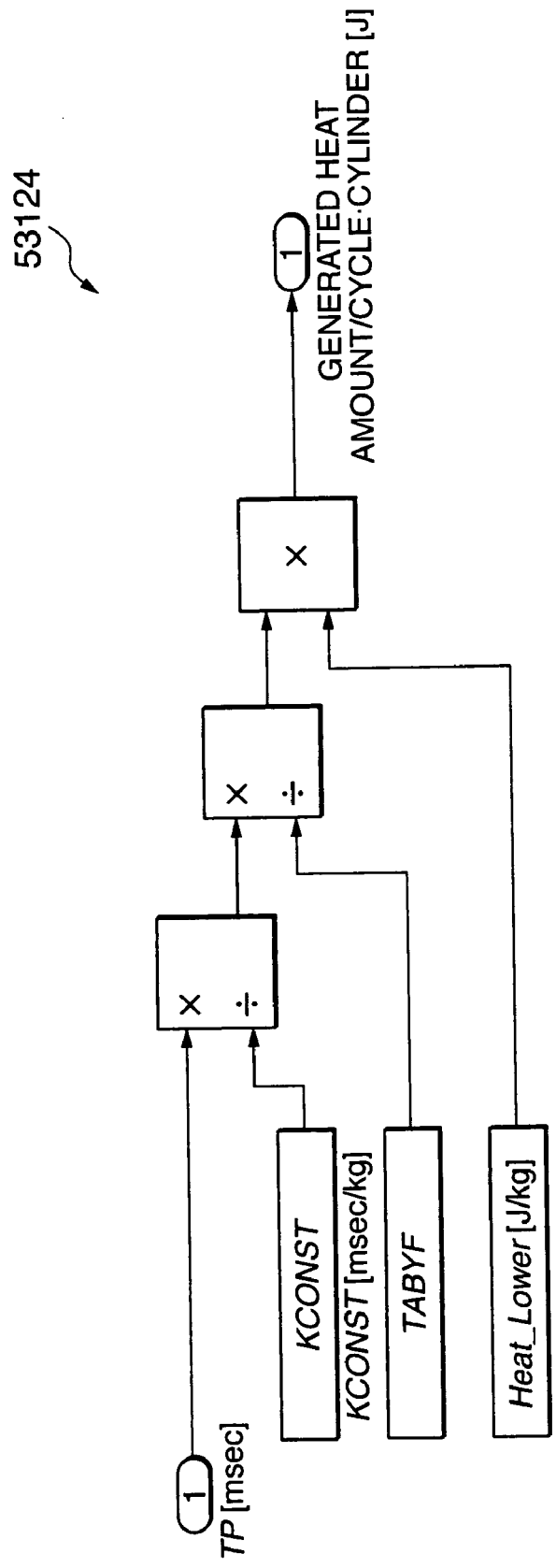
FIG. 14 is a block diagram illustrating a process for calculating an amount of heat generated per cylinder per cycle, as implemented by a first generated heat calculation block according to this invention.

Referring to FIG. 14, the first generated heat calculation block 53124 calculates the amount of heat generated per cylinder per cycle, on the basis of the fuel injection pulse width TP, the constant KCONST, the target air/fuel ratio TABYF and a lower heat value Heat_Lower.

The target air/fuel ratio TABYF is a target value for the air/fuel ratio of the combustion mixture as established by an air/fuel ratio controller in a separate unit. The lower heat value Heat_Lower is a value which expresses the amount of heat generated by combustion of the fuel, as an amount of heat per unit mass of air consumed in combustion.

Figure 15:
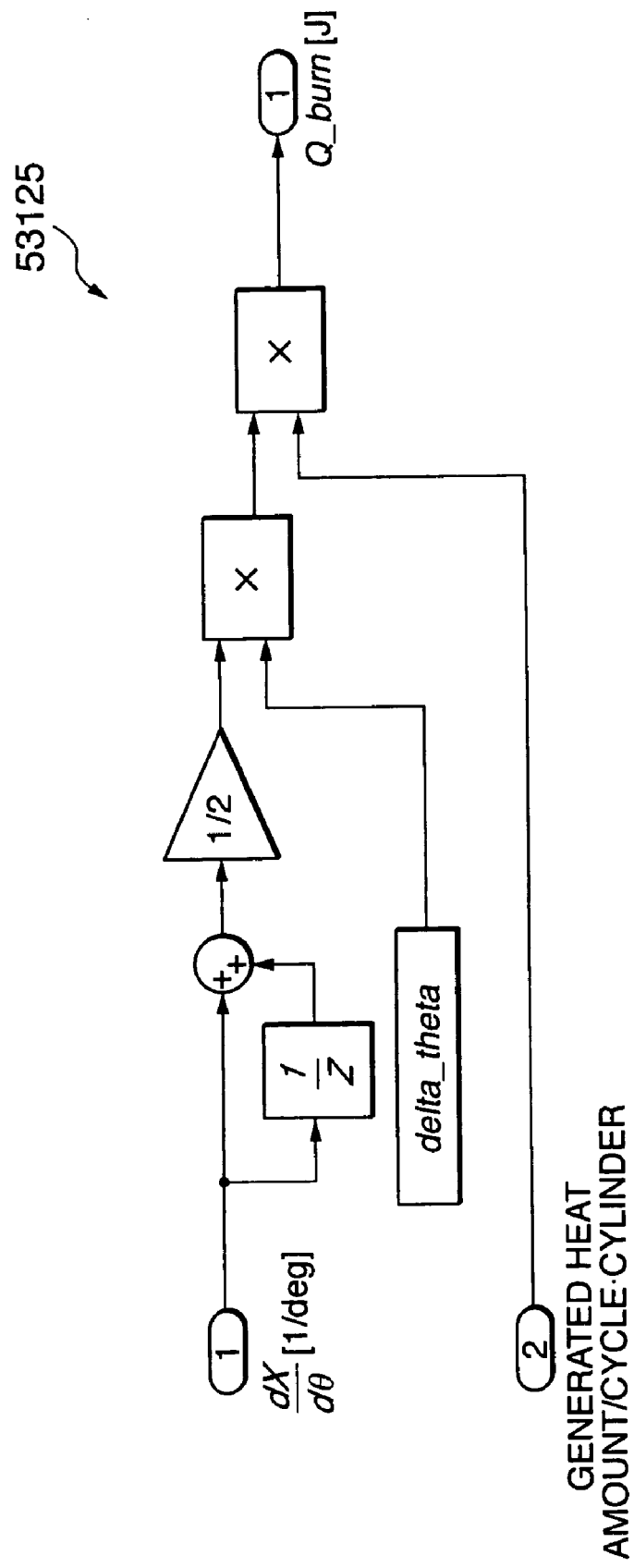
FIG. 15 is a block diagram illustrating a process for calculating an amount of heat generated Q_burn, as implemented by a second generated heat calculation block according to this invention.

Referring to FIG. 15, the second generated heat calculation block 53125 calculates an amount of heat Q_burn on the basis of the heat generation rate $$\frac{dX}{d\theta}$$

calculated by the heat generation rate calculation block 53122 and the amount of heat generated per cylinder per cycle as calculated by the first generated heat calculation block 531241.

Figure 16:
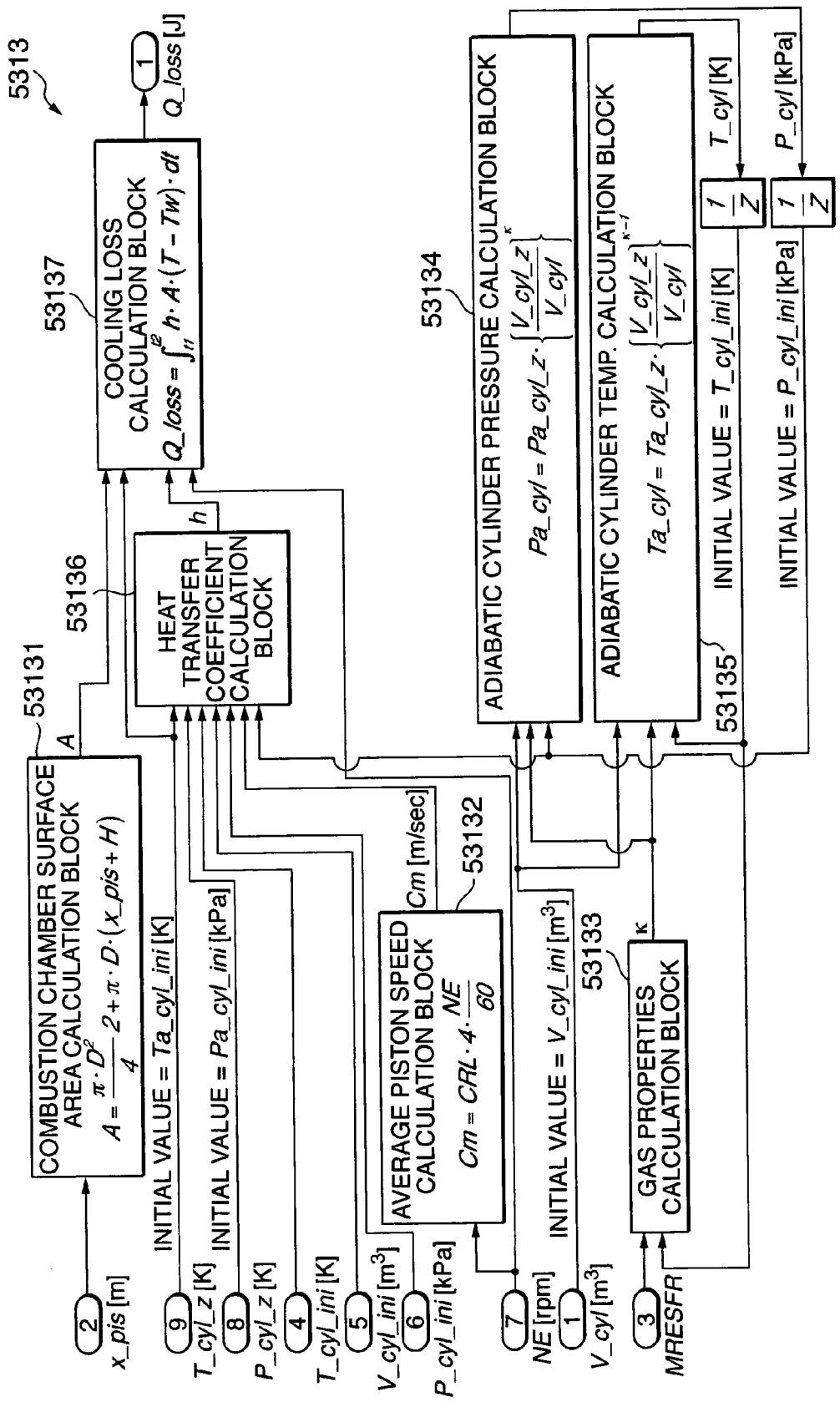
FIG. 16 is a block diagram showing the composition of a cooling loss calculation block according to this invention.

Next, referring to FIG. 16, the composition of the cooling loss calculation block 5313 will be described.

The cooling loss calculation block 5313 comprises a combustion chamber surface area calculation block 53131, an average piston speed calculation block 53132, a gas properties calculation block 53133, a cylinder pressure calculation block 53134, a cylinder temperature calculation block 53135, a heat transfer coefficient calculation block 53136, and a cooling loss calculation block 53137.

The combustion chamber surface area calculation block 53131 calculates the surface area of the combustion chamber 5 on the basis of the piston displacement x_pis. The average piston speed calculation block 53132 calculates the average piston speed on the basis of the engine speed NE. These are both arithmetic calculations, and detailed description thereof is omitted here.

The gas properties calculation block 53133 calculates a specific heat ratio κ on the basis of the mass combustion rate determined from the residual gas rate MRESFR and the cylinder temperature. The calculation method is the same at that used by the gas properties calculation block 53141 shown in FIG. 20. This calculation method is described hereinafter.

The cylinder pressure calculation block 53134 calculates the pressure in the cylinder P_cyl on the basis of the previous value of the cylinder pressure, the previous value of the cylinder volume, the current value of the cylinder volume, and the specific heat ratio κ. This calculation is made by assuming an adiabatic condition.

The cylinder temperature calculation block 53135 calculates the temperature in the cylinder T_cyl on the basis of the previous value of the cylinder temperature, the previous value of the cylinder volume, the current value of the cylinder volume, and the specific heat ratio κ. This calculation is made by assuming an adiabatic condition.

Next, the heat transfer coefficient calculation block 53136 will be described.

Firstly, a Woschni equation which is used to represent the cooling loss handled by the heat transfer coefficient calculation block 53136 and the cooling loss calculation block 53137, will be described.

The cooling loss QL is calculated by means of the following equation (6).

$$QL = \int_{t1}^{t2} h \cdot A \cdot (T - Tw) \cdot dt \qquad (6)$$

$$h = 110 \cdot d^{-0.2} \cdot P^{0.8} \cdot T^{-0.53} \cdot \left\{ C1 \cdot cm + C2 \cdot \frac{Vs \cdot T_1}{P_1 \cdot V_1} \cdot (P - P_M) \right\}^{0.8} 1 \qquad (7)$$

where,
h=the heat transfer coefficient $$\left( \frac{kcal}{m^2 \cdot h \cdot k} \right),$$

d=diameter of cylinder bore (m),
Vs=volume of the cylinder ($m^3$),
Cm=average piston speed (m/sec),
$P_I$=pressure in cylinder when air intake valve closed (kgf/$cm^2$),
$V_I$=volume of cylinder when air intake valve closed ($m^3$),
$T_I$=temperature in cylinder when air intake valve closed (K),
PM=pressure in cylinder (kgf/$cm^2$),
P=pressure in cylinder (kgf/$cm^2$),
T=cylinder temperature (K),
C1=6.18 (exhaust stroke) or 2.28 (compression stroke and expansion stroke), and
C2=3.24×$10^{-3}$ (m/sec-K).
C1 and C2 are generally used constants.

Figure 17:
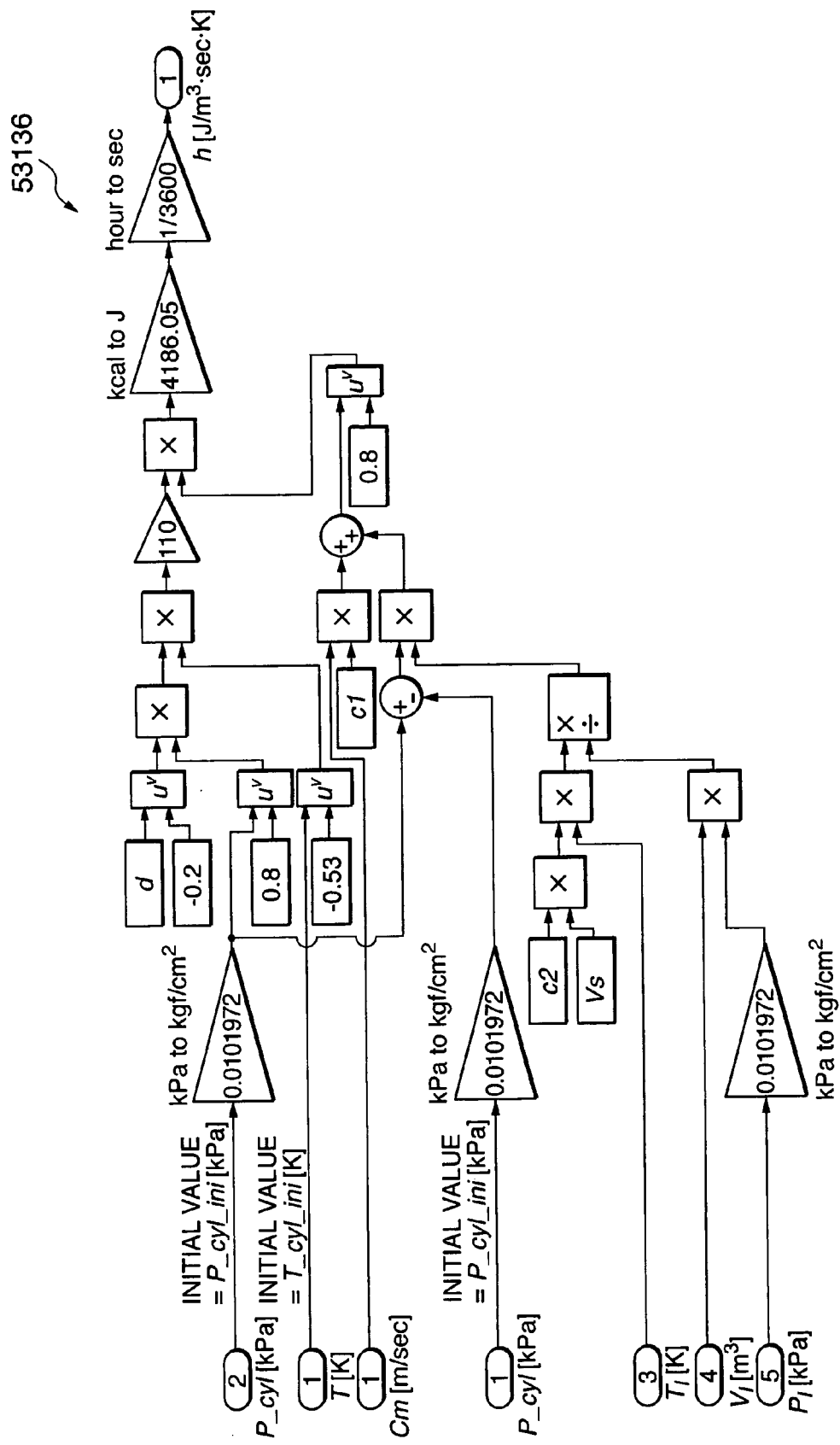
FIG. 17 is a block diagram illustrating a process for calculating a heat transfer coefficient h, as implemented by a heat transfer coefficient calculation block.

Referring to FIG. 17, the heat transfer coefficient calculation block 53136 calculates the heat transfer coefficient h in equation (8), on the basis of the cylinder pressure, the cylinder temperature, the average piston speed, the cylinder pressure, the initial cylinder temperature, the initial cylinder volume and the initial cylinder pressure.

Figure 18:
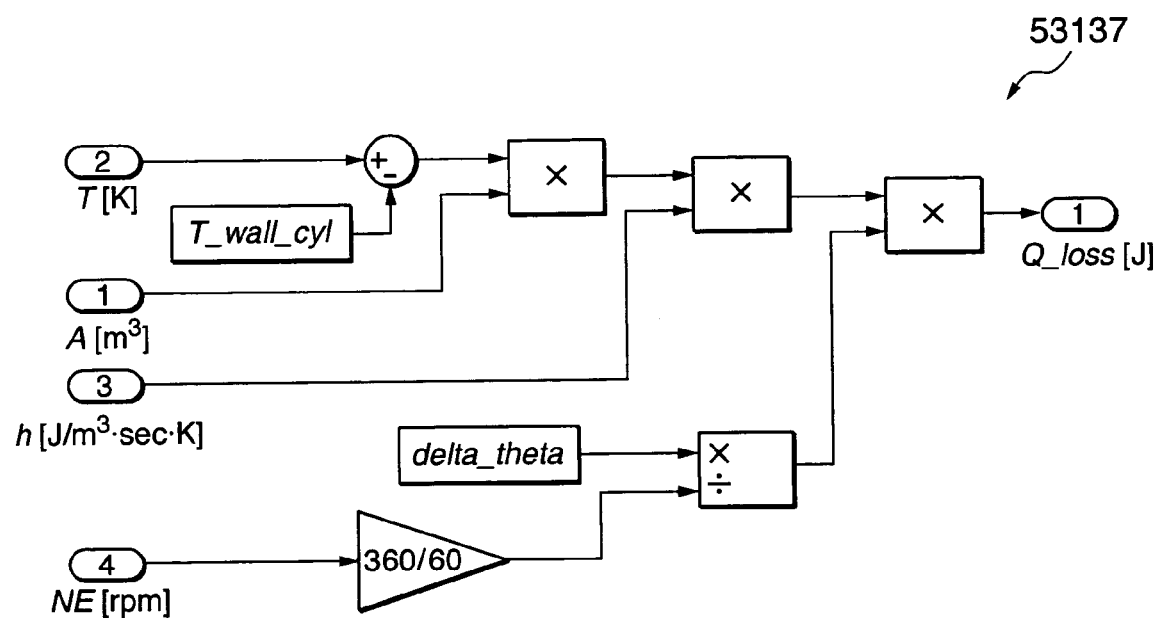
FIG. 18 is a block diagram illustrating a process for calculating a cooling loss Q_loss, as implemented by the cooling loss calculation block according to this invention.

Referring to FIG. 18, the cooling loss calculation block 53137 calculates the cooling loss Q_loss by solving equation (7) on the basis of the cylinder temperature, the combustion chamber wall temperature, the combustion chamber surface area, the heat transfer coefficient and the engine speed NE.

Figure 19:
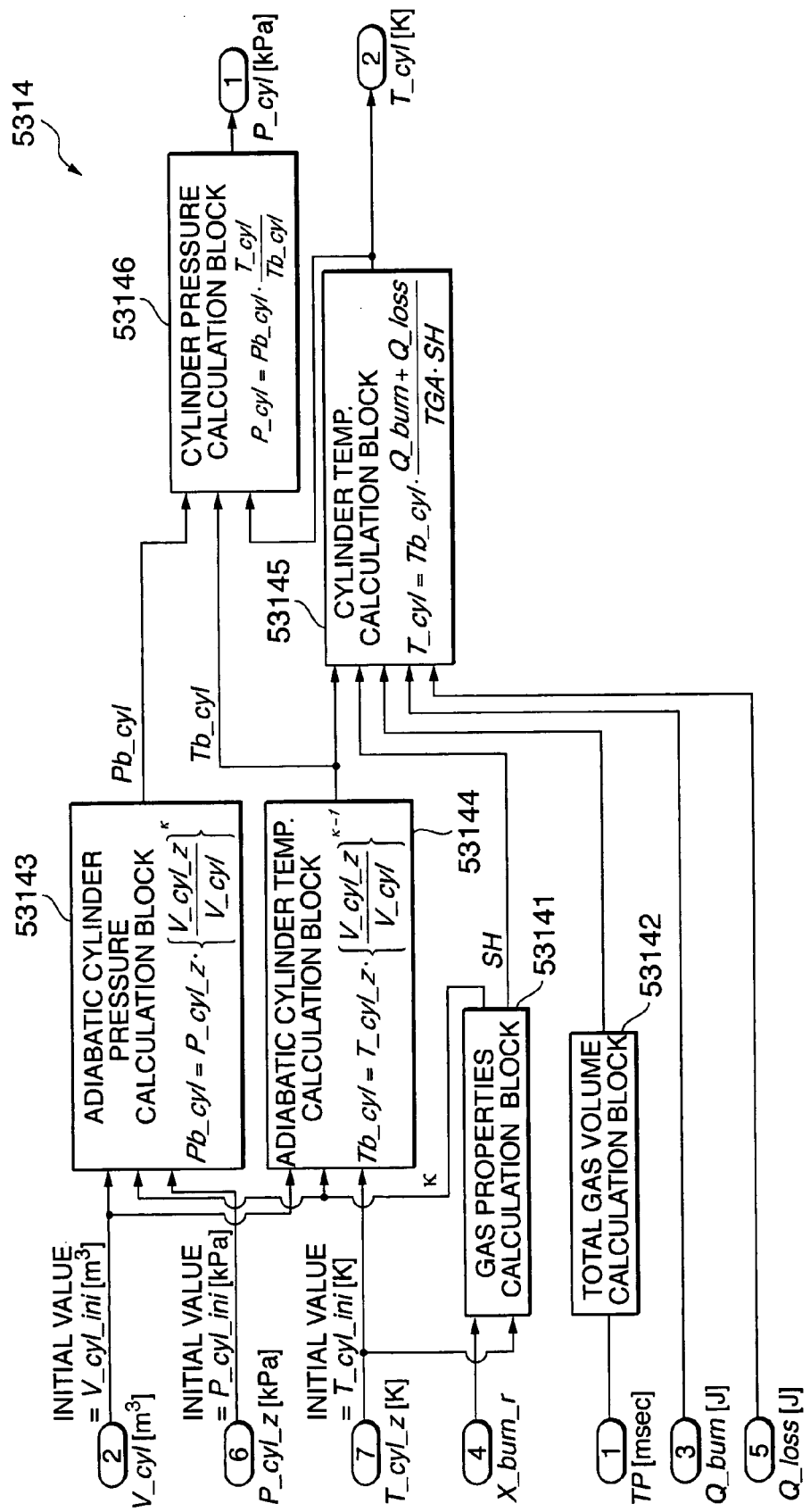
FIG. 19 is a block diagram showing the composition of a cylinder temperature and pressure calculation block according to this invention.

Next, the composition of the cylinder temperature and pressure calculation block 5314 will be described with reference to FIG. 19.

The cylinder temperature and pressure calculation block 5314 comprises a gas properties calculation block 53141, a total gas volume calculation block 53142, an adiabatic cylinder pressure calculation block 53143, an adiabatic cylinder temperature calculation block 53144, a cylinder temperature calculation block 53145, and a cylinder pressure calculation block 53146.

The gas properties calculation block 53141 calculates the physical properties of the gas (namely, the specific heat ratio and the specific heat at constant volume) on the basis of the mass combustion rate and the cylinder temperature.

Here, the following relationship, equation (8), applies when calculating the gas properties on the basis of the ratio of burned gas, in other words, the mass combustion rate for calculating properties.

(Gas property value)=(burned gas property value)×
(burned gas ratio)+(unburned gas property
value)×(1−burned gas ratio)  (8)

Figure 20:
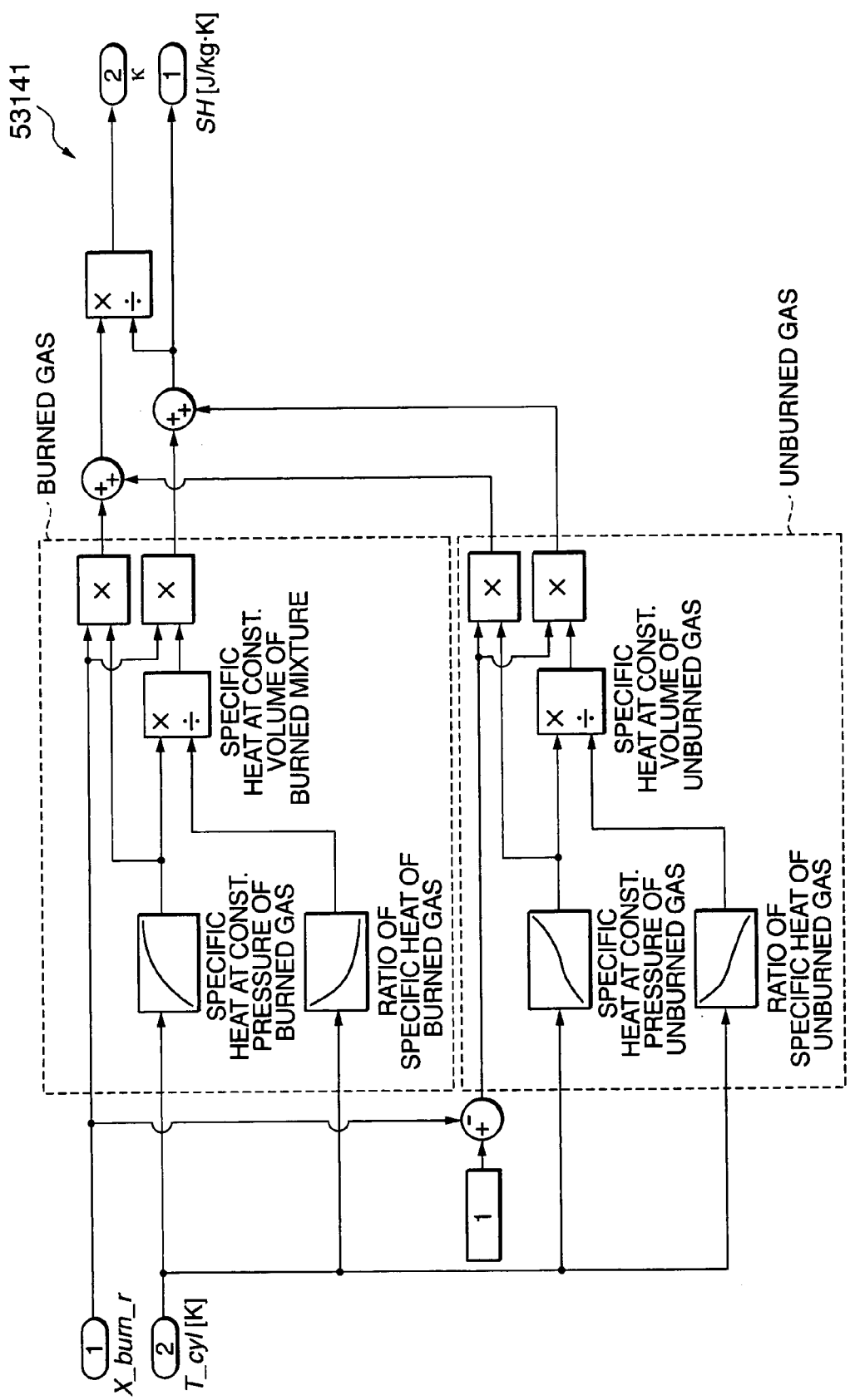
FIG. 20 is a block diagram illustrating a process for calculating properties of the gas in the cylinder, as implemented by a gas properties calculation block according to this invention.

Referring to FIG. 20, the gas properties calculation block 53141 determines the specific heat at constant volume and the specific heat ratio of the burned gas, on the basis of the cylinder temperature T_cyl. Similarly, it also determines the specific heat at constant volume and the specific heat ratio of the unburned gas, on the basis of the cylinder temperature T_cyl. It then calculates the properties of the gas in the cylinder by multiplying respectively by the ratios of burned gas and unburned gas. The initial value of the cylinder temperature T_cyl is T_cyl_ini.

Figure 21:
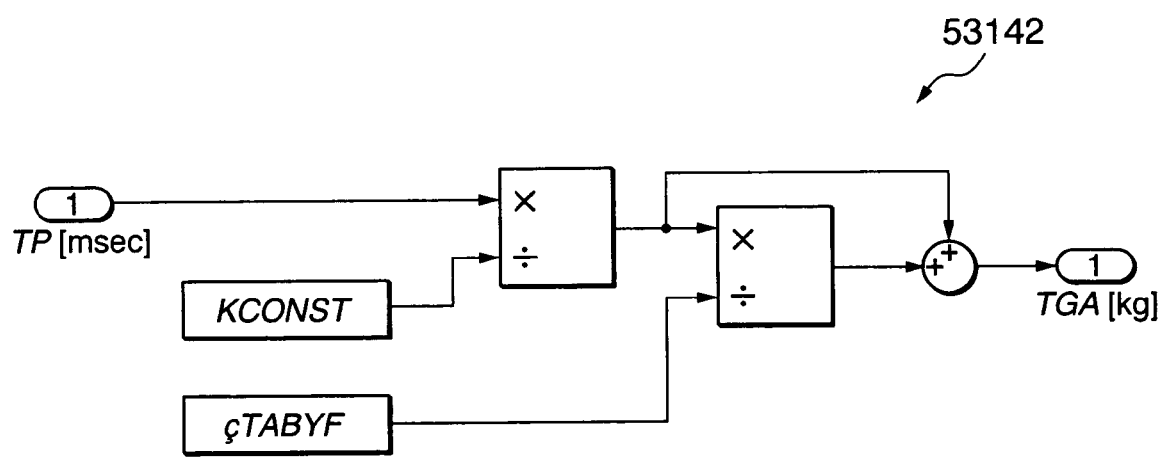
FIG. 21 is a block diagram illustrating a process for calculating a total gas volume, as implemented by a total gas volume calculation block according to this invention.

Referring to FIG. 21, the total gas volume calculation block 53142 calculates the total gas volume on the basis of the fuel injection pulse width TP, the constant KCONST and the target air/fuel ratio TABYF.

Referring back to FIG. 19, adiabatic cylinder pressure calculation block 53143 calculates the adiabatic cylinder pressure on the basis of the previous value of the cylinder pressure, the previous value of the cylinder volume, the current value of the cylinder volume, and the specific heat ratio κ.

The adiabatic change cylinder temperature calculation block 53144 calculates the adiabatic cylinder temperature on the basis of the previous value of the cylinder temperature, the previous value of the cylinder volume, the current value of the cylinder volume, and the specific heat ratio κ.

The cylinder temperature calculation block 53145 calculates the cylinder temperature T_cyl on the basis of the adiabatic cylinder temperature, the amount of heat generated, the cooling loss, the total gas volume and the specific heat at fixed volume.

The cylinder pressure calculation block 53146 calculates the cylinder pressure P_cyl on the basis of the adiabatic cylinder pressure, the cylinder temperature, and the adiabatic cylinder temperature.

Figure 7:
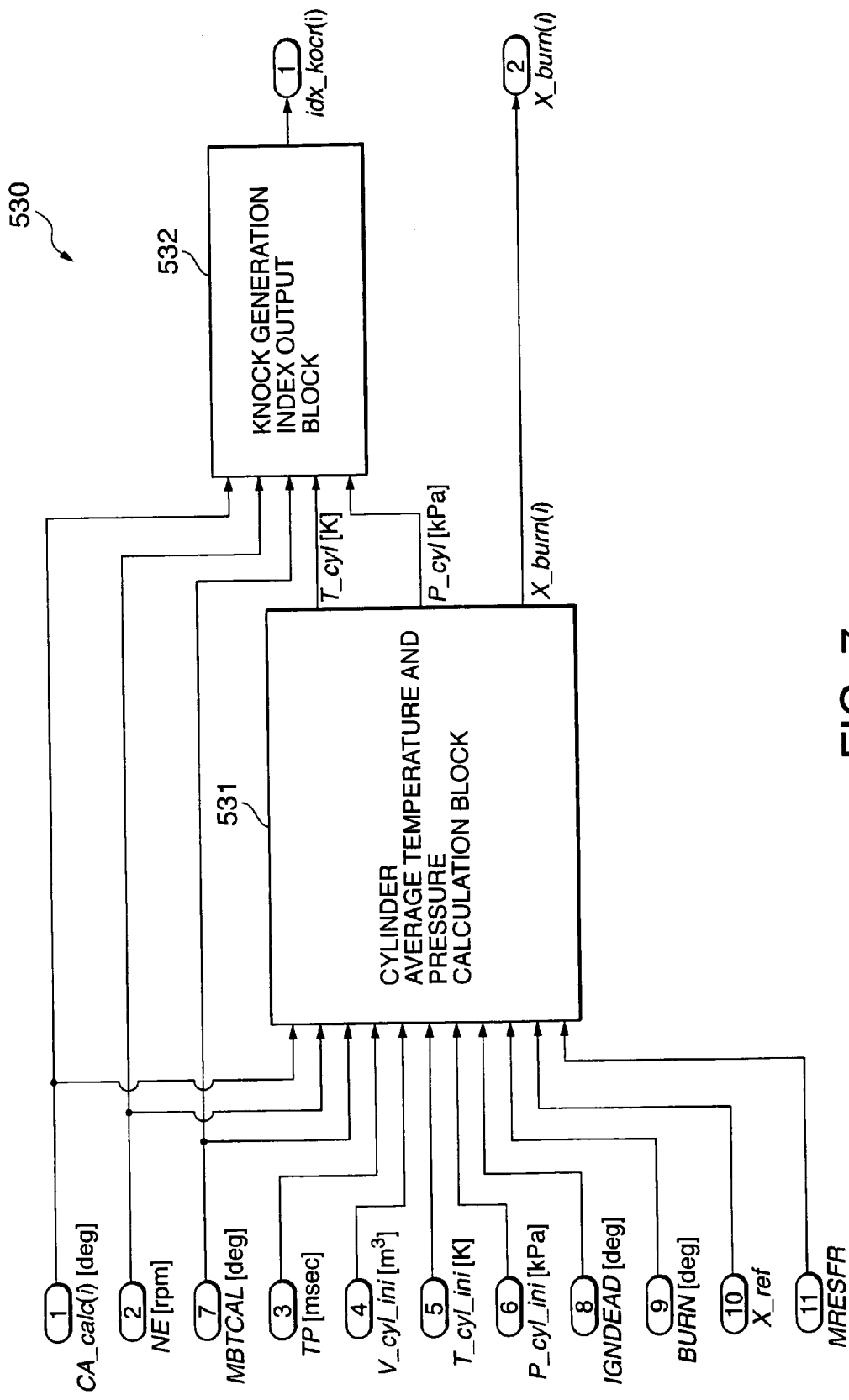
FIG. 7 is a block diagram showing the composition of a knock generation index calculation block according to this invention.

This concludes the description of the composition of the average cylinder temperature and pressure calculation block 531 shown in FIG. 7.

Next, referring to FIG. 7, the composition of the knock generation index output block 532 in FIG. 7 is described.

Figure 22:
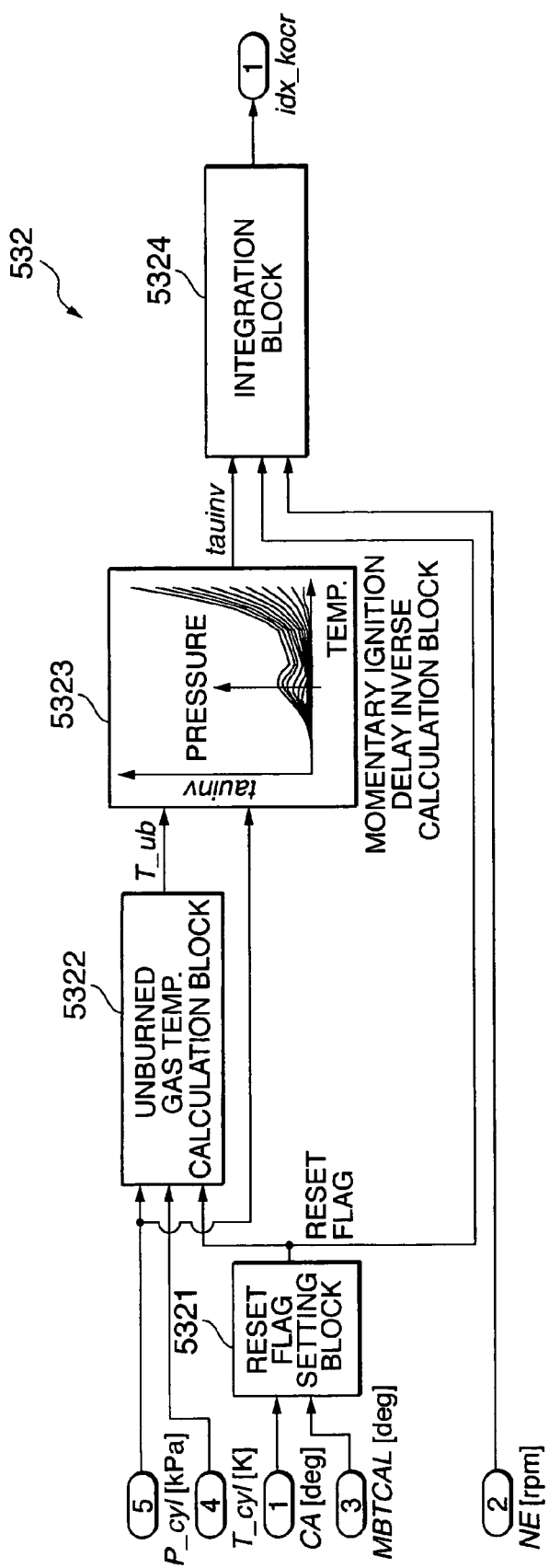
FIG. 22 is a block diagram showing the composition of a knock generation index output block according to this invention.

Referring to FIG. 22, the knock generation index output block 532 comprises a reset flag calculation block 5321, an unburned gas temperature calculation block 5322, a momentary ignition delay inverse calculation block 5323, and an integration block 5324.

Figure 23:
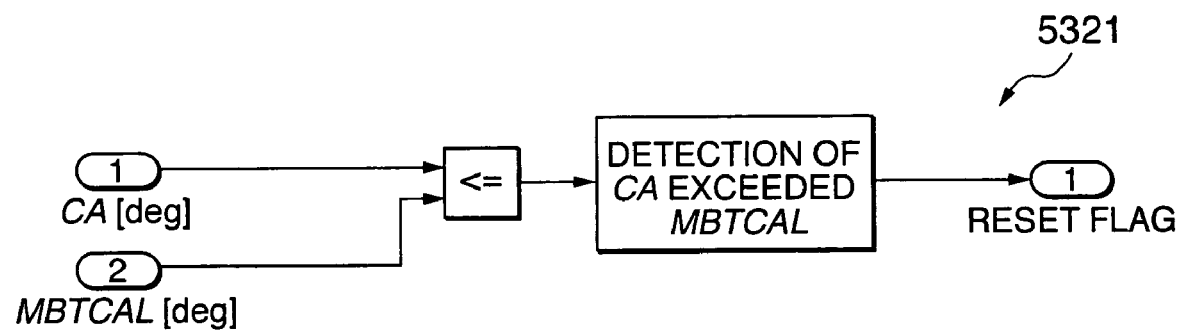
FIG. 23 is a block diagram illustrating a process for setting a reset flag, as implemented by a reset flag calculating block according to this invention.

Referring to FIG. 23, the reset flag setting block 5321 sets the reset flag to ON if the crank angle CA has exceeded the basic ignition timing MBTCAL.

Figure 24:
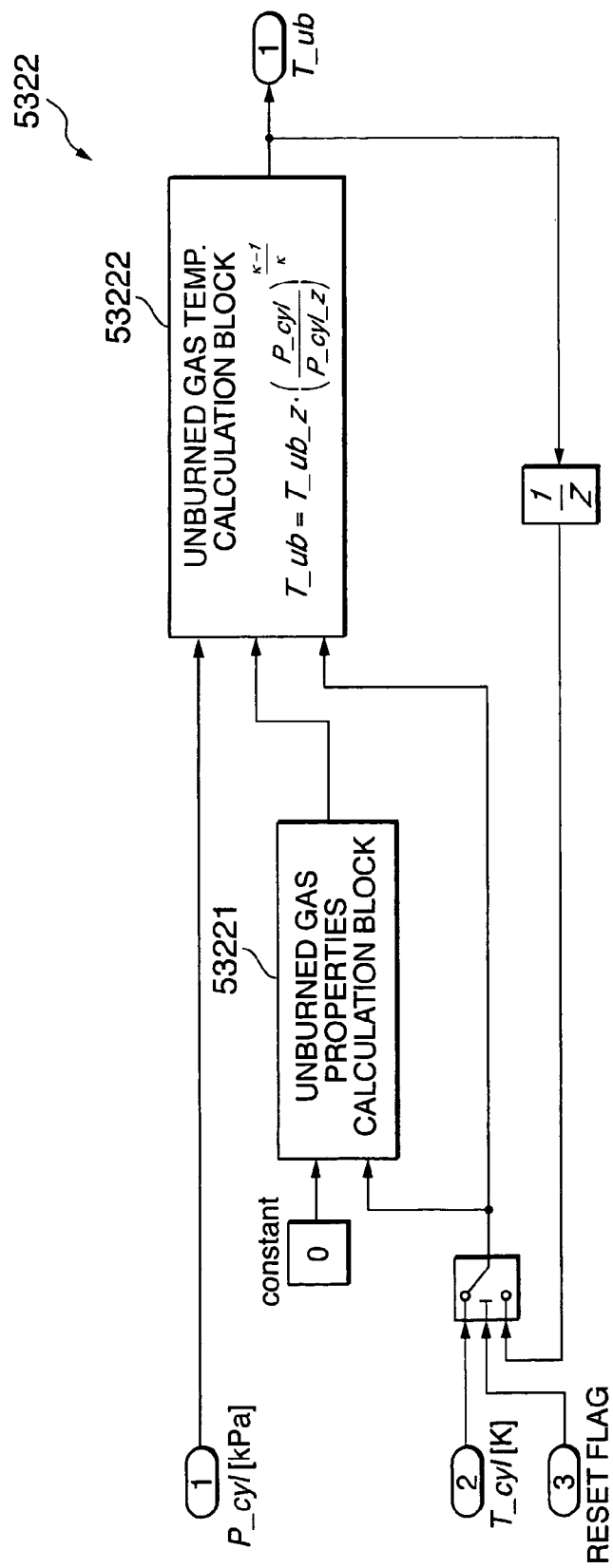
FIG. 24 is a block diagram showing the composition of an unburned gas temperature calculation block according to this invention.

Referring to FIG. 24, the unburned gas temperature calculation block 5322 comprises an unburned gas properties calculation block 53221 and an unburned gas temperature calculation block 53222. The unburned gas properties calculation block 53221 has the same composition as the gas properties calculation block 53141. Here, the properties of the unburned gas only are calculated by entering a mass combustion rate of zero. The unburned gas temperature calculation block 53222 calculates the unburned gas temperature T_ub on the basis of the previous value of the unburned gas temperature, the current value of the cylinder pressure, the previous value of the cylinder pressure, and the specific heat ratio κ.

The momentary ignition delay inverse calculation block 5323 calculates the inverse of the momentary ignition delay tauinv, on the basis of the unburned gas temperature T_ub and the cylinder pressure P_cyl, by referring to a map established previously through experimentation.

Figure 25:
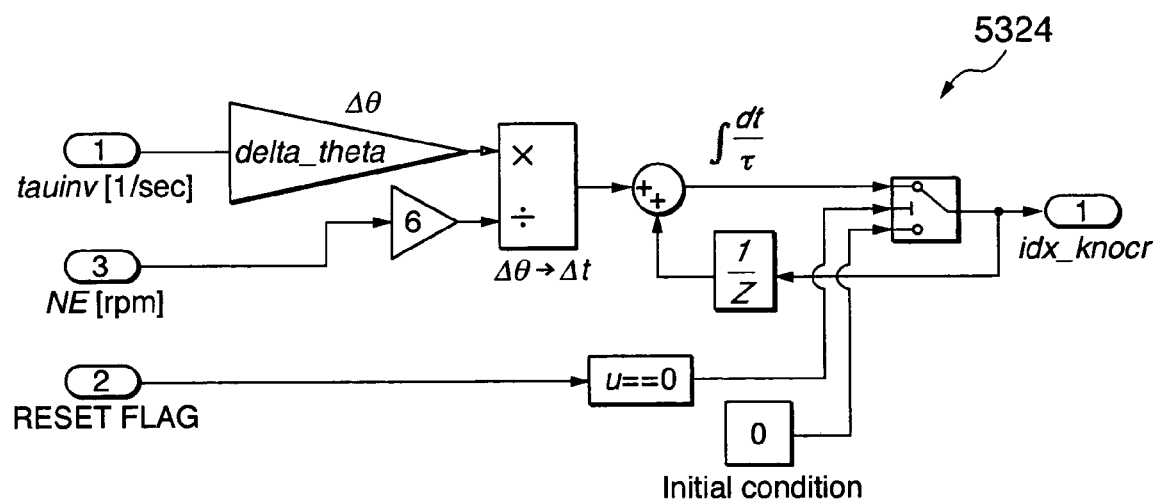
FIG. 25 is a block diagram illustrating a process for calculating a knock generation index idx_kocr, as implemented by an integration block according to this invention.

Referring to FIG. 25, the integration block 5324 calculates the time required for rotation through the predetermined crank angle, from the engine speed NE, and it calculates a knock generation index idx_kocr by integrating the inverse of the momentary ignition delay tauinv, with respect to time. When the reset flag is ON, zero is input as an initial value for the knock generation index idx_kocr.

This concludes the description of the composition of the knock generation index calculation unit 53 shown in FIG. 5.

Figure 26:
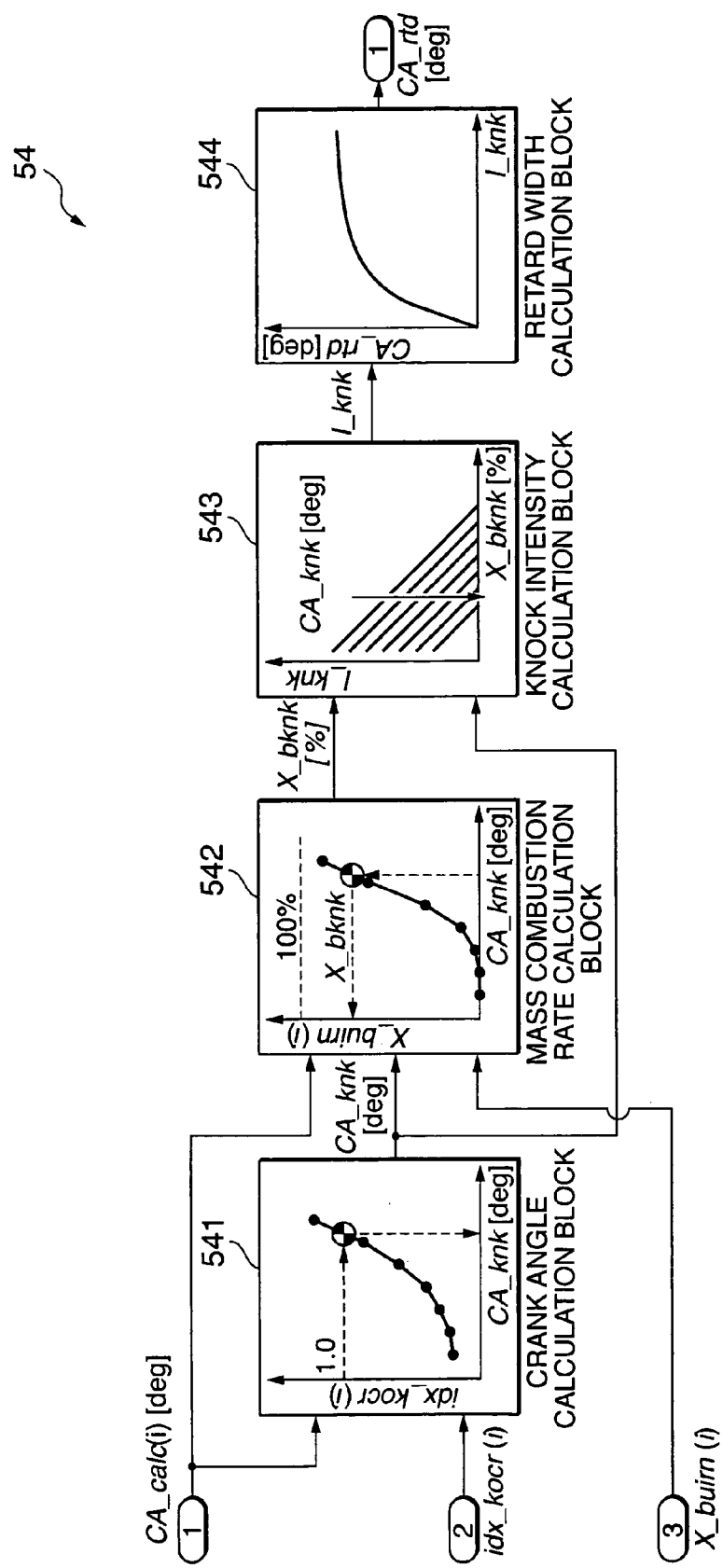
FIG. 26 is a block diagram showing the composition of an advance correction limit calculation unit according to this invention.

Next, referring to FIG. 26, the composition of the advance correction limit calculation unit 54 shown in FIG. 5 will be described. The advance correction limit calculation unit 54 comprises a crank angle calculation block 541, a mass combustion rate calculation block 542, a knock intensity calculation block 543 and a retard width calculation block 544.

The crank angle calculation block 541 determines the crank angle at knock CA_knk from the knock generation index idx_kocr(i) and the processed crank angle CA_calc(i), on the basis of a characteristics graph such as that shown in the diagram, as determined previously by experimentation. Here, the processed crank angle CA_calc(i) at the time that the knock generation index idx_knocr(i) reaches a threshold value of 1.0 is taken as the crank angle at knock CA_knk. The direction of the arrow on the crank angle CA_calc(i) marked on the horizontal axis corresponds to the retard direction.

The mass combustion rate calculation block 542 determines the mass combustion rate at knock X_bknk, from the processed crank angle CA_calc(i), the mass combustion rate X_burn(i) and the crank angle at knock CA_knk, on the basis of a characteristics graph such as that shown in the diagram, as determined previously by experimentation.

The knock intensity calculation block 543 determines the knock intensity I_knk from the crank angle at knock CA_knk and the mass combustion rate at knock X_bknk. In the diagram, the direction indicated by the arrow, in other words, the downward direction is the retard direction.

The retard width calculation block 544 determines the retard width CA_rtd from the knock intensity I_knk on the basis of a characteristics graph such as that shown in the diagram, as determined previously by experimentation. The retard width CA_rtd indicates the retard amount from the basic ignition timing MTBCAL, and this corresponds to the advance correction limit.

Figure 27:
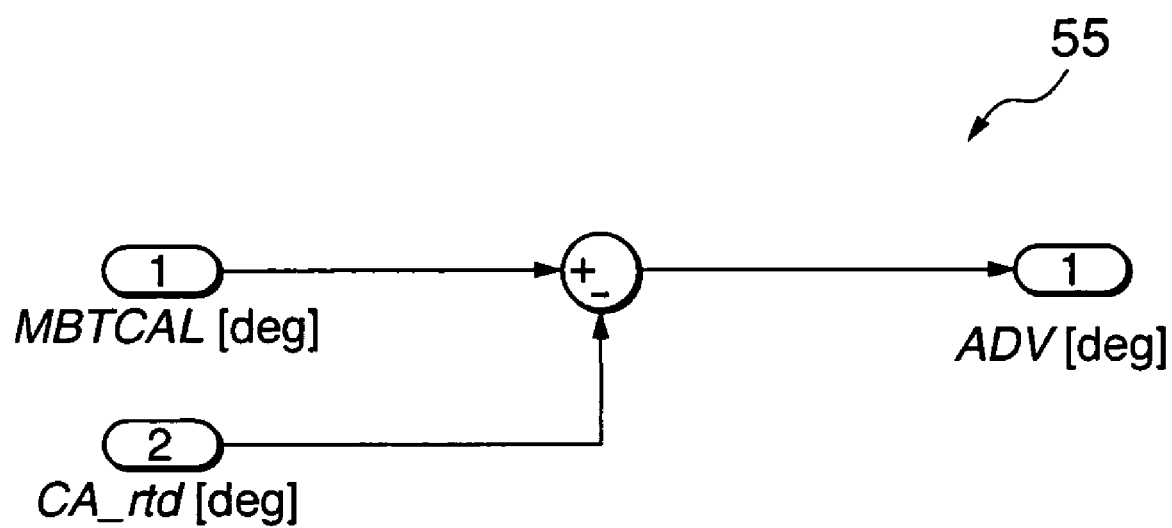
FIG. 27 is a block diagram illustrating a process for calculating an ignition timing ADV, as implemented by an ignition timing calculation unit according to this invention.

Next, referring to FIG. 27, an ignition timing calculation unit 55 shown in FIG. 5 will be described. The ignition timing calculation unit 55 determines an ignition timing ADV which is retarded by the retard width CA_rtd with respect to the basic ignition timing MBTCAL.

In this invention, the knock limit ignition timing is calculated on the basis of the ignition delay. The flammable gas combusts in an explosion when a predetermined ignition delay determined according to the engine model and conditions has elapsed. There is a very close correlation between the ignition delay and the likelihood of knock occurring.

By calculating the knock limit ignition timing on the basis of the ignition delay as in this invention, it is possible to calculate the knock limit ignition timing accurately.

The ignition delay is determined uniformly according to the temperature and pressure, for each engine model. By calculating the cylinder temperature and the cylinder pressure and then calculating the ignition delay from the resulting values, it is possible to achieve virtually uniform antiknock characteristics, regardless of the engine specifications. Furthermore, the ignition delay can be calculated to a high level of accuracy in real time, irrespective of the warm-up state of the engine and the environmental conditions.

There is a very close correlation between the ignition delay of the gas in the cylinder and the temperature of the unburned gas. Therefore, by calculating the unburned gas temperature and then calculating the ignition delay on the basis of this unburned gas temperature, the ignition delay can be calculated more accurately.

It can be estimated accurately whether or not knocking will actually occur, from the knock timing and the mass combustion rate immediately prior to knocking, and based on this result, it is possible to calculate the knock limit ignition timing accurately.

If knock is predicted, then the actual occurrence of knock can be avoided by applying a retard correction to the ignition timing. The basic ignition timing can be set to MBT at all times, and hence the number of adaptation steps can be reduced and fuel consumption can be improved. By setting a suitable retard amount, it is possible to prevent deterioration of fuel consumption and operational performance due to excessive retardation.

Moreover, in this invention, it is possible to calculate the mass combustion rate more easily and appropriately by referring to heat generation patterns.

By integrating the inverse of the momentary ignition delay at each instant, to account for changes in the cylinder temperature and the cylinder pressure, it is possible to calculate the knock generation index more accurately. By increasing the number of calculation points at each calculation crank angle, it is possible to increase the accuracy of the knock index calculation.

The integral of the inverse of the momentary ignition delay provides an index that indicates the "likelihood that knock will occur". Therefore, by comparing this index with a predetermined threshold value, it is possible to determine a crank angle at which knock will occur.

Since the knock generation timing and the knock limit ignition timing are calculated on the basis of the ignition delay, it is possible to reduce the number of adaptation steps required for actual implementation in an engine, regardless of the engine model.

Since the knock limit ignition timing can be calculated without using internal cylinder pressure sensors, it is possible to ensure that the cost of implementing the invention is kept low.

The contents of Tokugan 2004-044423, with a filing date of Feb. 20, 2004 and Tokugan 2004-044495, with a filing date of Feb. 20, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the embodiment described above, the knock generation index is derived by integrating the inverse of the ignition delay $\int 1/\tau \cdot dt$ with respect to time, but the knock generation index may also be determined by integrating the inverse of the ignition delay with respect to the crank angle theta, instead of time.

In the above embodiments, the parameters required for control are detected using sensors, but this invention can be applied to any ignition timing control device and method which perform the claimed control using the claimed parameters regardless of how the parameters are acquired.

The embodiments of this invention in which an exclusive property or privilege is claimed are defined as follows.

What is claimed is:

1. An ignition timing control device for an internal combustion engine which causes an air/fuel mixture inside a cylinder to combust by means of ignition by a spark plug, comprising:

a programmable controller programmed to:
calculate an ignition delay of the gas inside the cylinder on the basis of an operational state of the engine;
calculate a knock generation index forming an indicator of the occurrence of knock, on the basis of the ignition delay;
calculate a limit ignition timing at which knock is not generated, on the basis of the knock generation index; and
control the ignition timing of the spark plug to the limit ignition timing at which knock is not generated.

2. The ignition timing control device as defined in claim 1, wherein the controller is further programmed to calculate a temperature and pressure in the cylinder on the basis of the operating state, and to calculate the ignition delay of the gas in the cylinder on the basis of the temperature and pressure in the cylinder.

3. The ignition timing control device as defined in claim 2, wherein the controller is further programmed to calculate a temperature of the unburned gas in the cylinder on the basis of the operational state and the temperature and pressure in the cylinder, and to calculate the ignition delay of the gas in the cylinder on the basis of the temperature of the unburned gas and the pressure in the cylinder.

4. The ignition timing control device as defined in claim 1, wherein the operational state includes a crank angle of the engine, and the controller is further programmed to calculate a current mass combustion rate from the crank angle, to calculate a crank angle at knock on the basis of the knock generation index, to calculate the mass combustion rate of the gas in the cylinder with respect to the crank angle at knock, and to calculate the limit ignition timing at which knock is not generated, from the mass combustion rate of the gas in the cylinder with respect to the crank angle at knock, and the current mass combustion rate.

5. The ignition timing control device as defined in claim 4, wherein the controller is further programmed to determine the limit ignition timing at which knock is not generated on the basis of the crank angle at the time that the knock generation index reaches a predetermined threshold value.

6. The ignition timing control device as defined in claim 4, wherein the controller is further programmed to calculate a basic ignition timing on the basis of the operational state, to calculate a retard width from the mass combustion rate of the gas in the cylinder with respect to the crank angle at knock, and the current mass combustion rate, and to determine the limit ignition timing at which knock is not generated, by retarding the basic ignition timing on the basis of the retard width.

7. The ignition timing control device as defined in claim 6, wherein the controller is further programmed to increase the retard width, as the mass combustion rate of the gas in the cylinder with respect to the crank angle at knock decreases.

8. The ignition timing control device as defined in claim 6, wherein the controller is further programmed to increase the retard width, as the crank angle at knock increases in the advance direction.

9. The ignition timing control device as defined in claim 2, wherein the operational state includes a crank angle of the engine and an intake air volume, and the controller is further to calculate a heat generation pattern of the gas in the cylinder with respect to the crank angle, on the basis of the intake air volume, and to calculate the temperature and pressure in the cylinder on the basis of the heat generation pattern.

10. The ignition timing control device as defined in claim 9, wherein the controller is further programmed to calculate the mass combustion rate of the gas in the cylinder with respect to the crank angle, from the heat generation pattern, and to calculate the mass combustion rate of the gas in the cylinder with respect the crank angle at knock, on the basis of the mass combustion rate of the gas in the cylinder with respect to the crank angle and the crank angle at knock.

11. The ignition timing control device as defined in claim 1, wherein the controller is further programmed to calculate the ignition delay of the gas in the cylinder at predetermined intervals, and to calculate a knock generation index by integrating an inverse of the ignition delay.

12. The ignition timing control device as defined in claim 11, wherein the controller is further programmed to change an integration interval in accordance with the operational state.

13. The ignition timing control device as defined in claim 12, wherein the controller is further programmed to calculate a basic ignition timing on the basis of the operational state, and to set the basic ignition timing as the start point of the integration interval.

14. The ignition timing control as defined in claim 12, wherein the controller is further programmed to calculate a combustion speed of the air/fuel mixture on the basis of the operational state, and to determine the end point of the integration interval on the basis of the combustion speed.

15. The ignition timing control device as defined in claim 14, wherein the controller is further programmed to calculate a mass combustion rate of the air/fuel mixture on the basis of the combustion speed, and to determine that the integration interval has ended when the mass combustion rate has reached a predetermined value.

16. The ignition timing control device as defined in claim 14, wherein the controller is further programmed to calculate the mass combustion rate of the air/fuel mixture on the basis of the combustion speed, and to determine that the integration interval has ended when the mass combustion rate has reached the predetermined value, or when the knock generation index has reached a predetermined threshold value.

17. The ignition timing control device as defined in claim 12, wherein the controller is further programmed to determine that the integration interval has ended when the knock generation index has reached a predetermined threshold value.

18. An ignition timing control device for an internal combustion engine which causes an air/fuel mixture inside a cylinder to combust by means of ignition by a spark plug, comprising:
  means for calculating an ignition delay of the gas inside the cylinder on the basis of an operational state of the engine;
  means for calculating a knock generation index forming an indicator of the occurrence of knock, on the basis of the ignition delay;
  means for calculating a limit ignition timing at which knock is not generated, on the basis of the knock generation index; and
  means for controlling the ignition timing of the spark plug to the limit ignition timing at which knock is not generated.

19. An ignition timing control method for an internal combustion engine which causes an air/fuel mixture inside a cylinder to combust by means of ignition by a spark plug, comprising:
  calculating an ignition delay of the gas inside the cylinder on the basis of an operational state of the engine;
  calculating a knock generation index forming an indicator of the occurrence of knock, on the basis of the ignition delay;
  calculating a limit ignition timing at which knock is not generated, on the basis of the knock generation index; and
  controlling the ignition timing of the spark plug to the limit ignition timing at which knock is not generated.

* * * * *